US009065957B2

(12) United States Patent
Shibata

(10) Patent No.: US 9,065,957 B2
(45) Date of Patent: Jun. 23, 2015

(54) SYSTEM, SERVER, COMMUNICATION DEVICE, AND COMPUTER READABLE MEDIUM THEREFOR

(71) Applicant: Hiroshi Shibata, Obu (JP)

(72) Inventor: Hiroshi Shibata, Obu (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/019,999

(22) Filed: Sep. 6, 2013

(65) Prior Publication Data

US 2014/0092413 A1   Apr. 3, 2014

(30) Foreign Application Priority Data

Sep. 28, 2012   (JP) ................. 2012-218126

(51) Int. Cl.
*G06F 3/12*  (2006.01)
*H04N 1/00*  (2006.01)

(52) U.S. Cl.
CPC ....... *H04N 1/00962* (2013.01); *H04N 1/00204* (2013.01); *H04N 1/00244* (2013.01); *H04N 1/00973* (2013.01); *H04N 2201/0044* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 7,016,062 B2 * | 3/2006 | Ishizuka | ............... 358/1.15 |
| 2002/0054711 A1 * | 5/2002 | Hwang et al. | ............ 382/240 |
| 2003/0002072 A1 * | 1/2003 | Berkema et al. | ......... 358/1.15 |

FOREIGN PATENT DOCUMENTS

JP     2009-184225 A     8/2009

* cited by examiner

*Primary Examiner* — Marcus T Riley
(74) *Attorney, Agent, or Firm* — Scully, Scott, Murphy & Presser, P.C.

(57) ABSTRACT

Computer readable instructions cause the server to generate, in response to receiving a request, first specific data. The first specific data comprises a first location information for location of first web data configured to display a message screen for specifying new setting information including the first setting information for the communication device. The first specific data is configured to be in a format for transmission using the protocol. The computer readable instructions further cause the server to generate, in response to receiving new setting information, a second specific data. The second specific data comprises second location information for location of second web data configured to display one or more instructions for transmitting the new setting information from the terminal device to the communication device using a short-range wireless communication. The second specific data is configured to be in a format for transmission using the protocol.

27 Claims, 10 Drawing Sheets

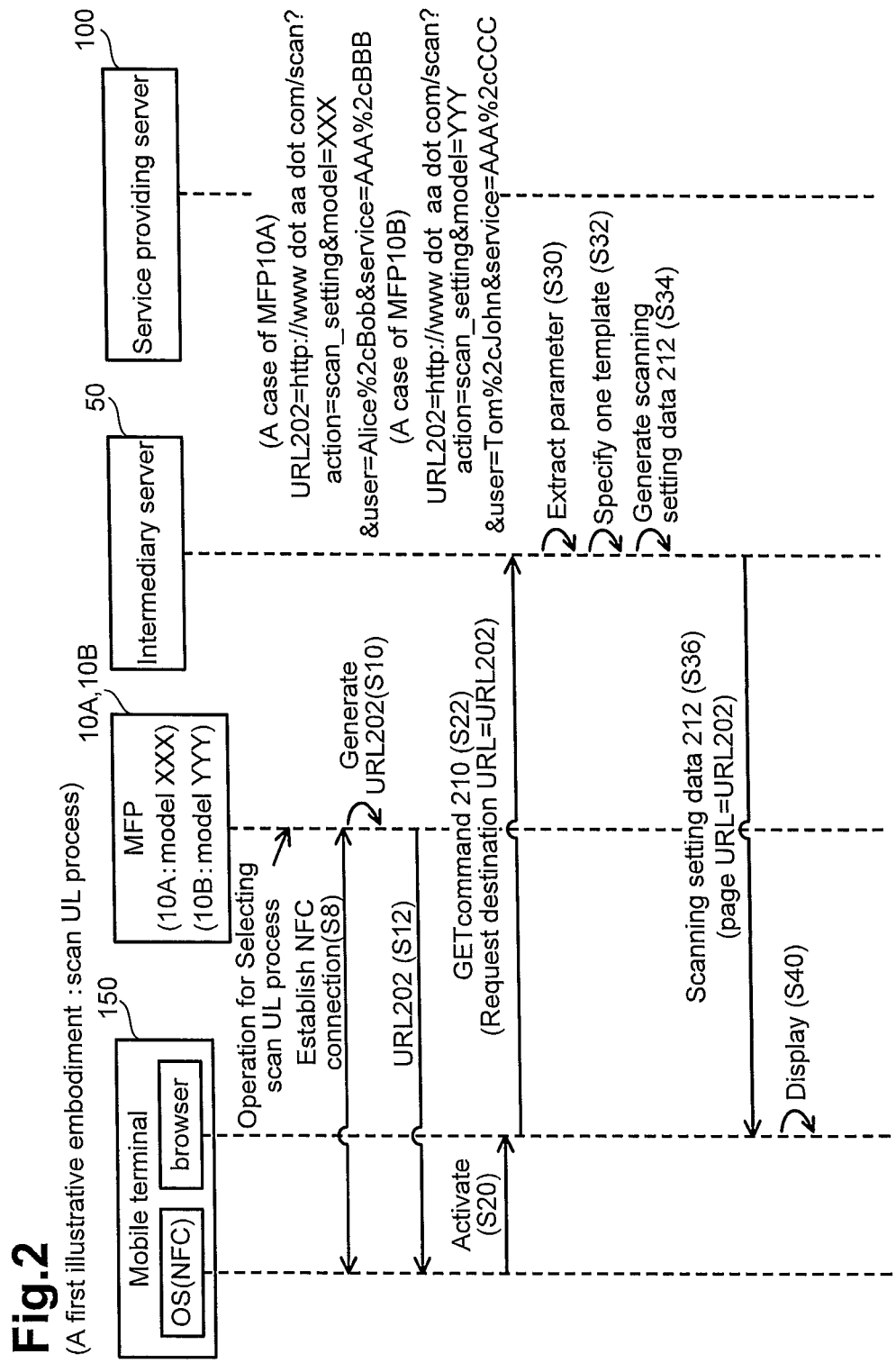

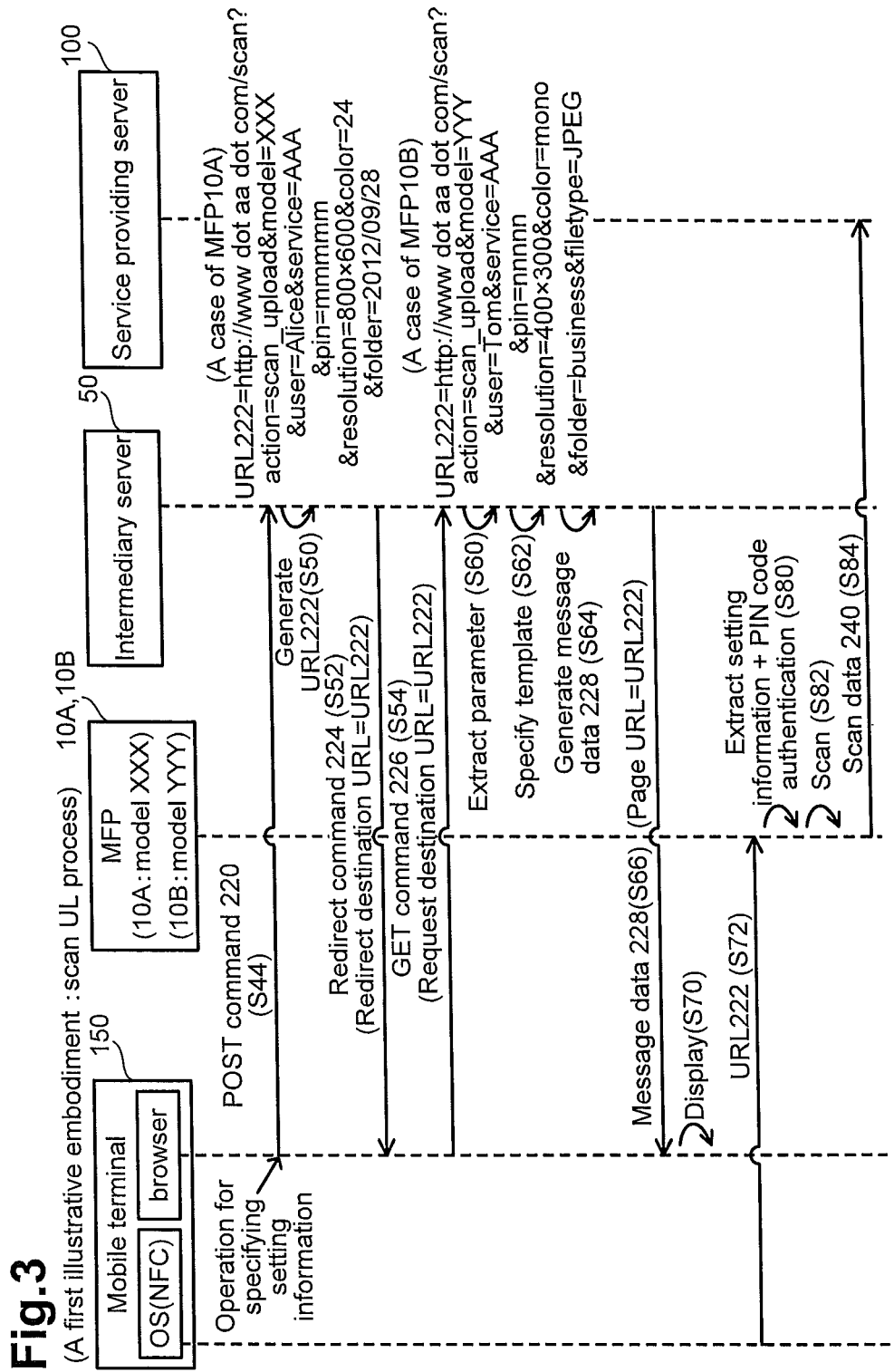

Fig.4

(For MFP10A)
Scanning setting screen 212a

```
http://www dot aa dot com/scan?
action=scan_setting&model=XXX
&user=Alice%2cBob
&service=AAA%2cBBB
```

MFP[XXX] Scan Wizard Step1

Please select your account
Alice Service AAA
Bob Service BBB

PIN
[         ]

Resolution
[ 800×600 ]

Color
[ 24bit Color ]

Folder Name
[         ]

[OK]

↓

Message screen 228a

```
http://www dot aa dot com/scan?
action=scan_upload&model=XXX
&user=Alice&service=AAA
&pin=mmmmm&resolution=800×600
&color=24&folder=2012/09/28
```

MFP[XXX] Scan Wizard Step2

Please bring your mobile terminal closer to MFP for communicating by NFC

User: Alice
Service: AAA
Resolution: 800×600
Color: 24bit Color
Folder Name: 2012/09/28

---

(For MFP10B)
Scanning setting screen 212b

```
http://www dot aa dot com/scan?
action=scan_setting&model=YYY
&user=Tom%2cJohn
&service=AAA%2cCCC
```

MFP[YYY] Scan Wizard Step1

Please select your account
Tom Service AAA
John Service CCC

PIN
[         ]

Resolution
[ 800×600 ]

Color
[ 24bit Color ]

Folder Name
[         ]

File Type
[ JPEG ]

[OK]

↓

Message screen 228b

```
http://www dot aa dot com/scan?
action=scan_upload&model=YYY
&user=Tom&service=AAA
&pin=nnnnn&resolution=400×300
&color=mono&folder=business
&filetype=JPEG
```

MFP[YYY] Scan Wizard Step2

Please bring your mobile terminal closer to MFP for communicating by NFC

User: Tom
Service: AAA
Resolution: 400×300
Color: mono
Folder Name: business
File Type: JPEG (A first illustrative embodiment : Network setting)

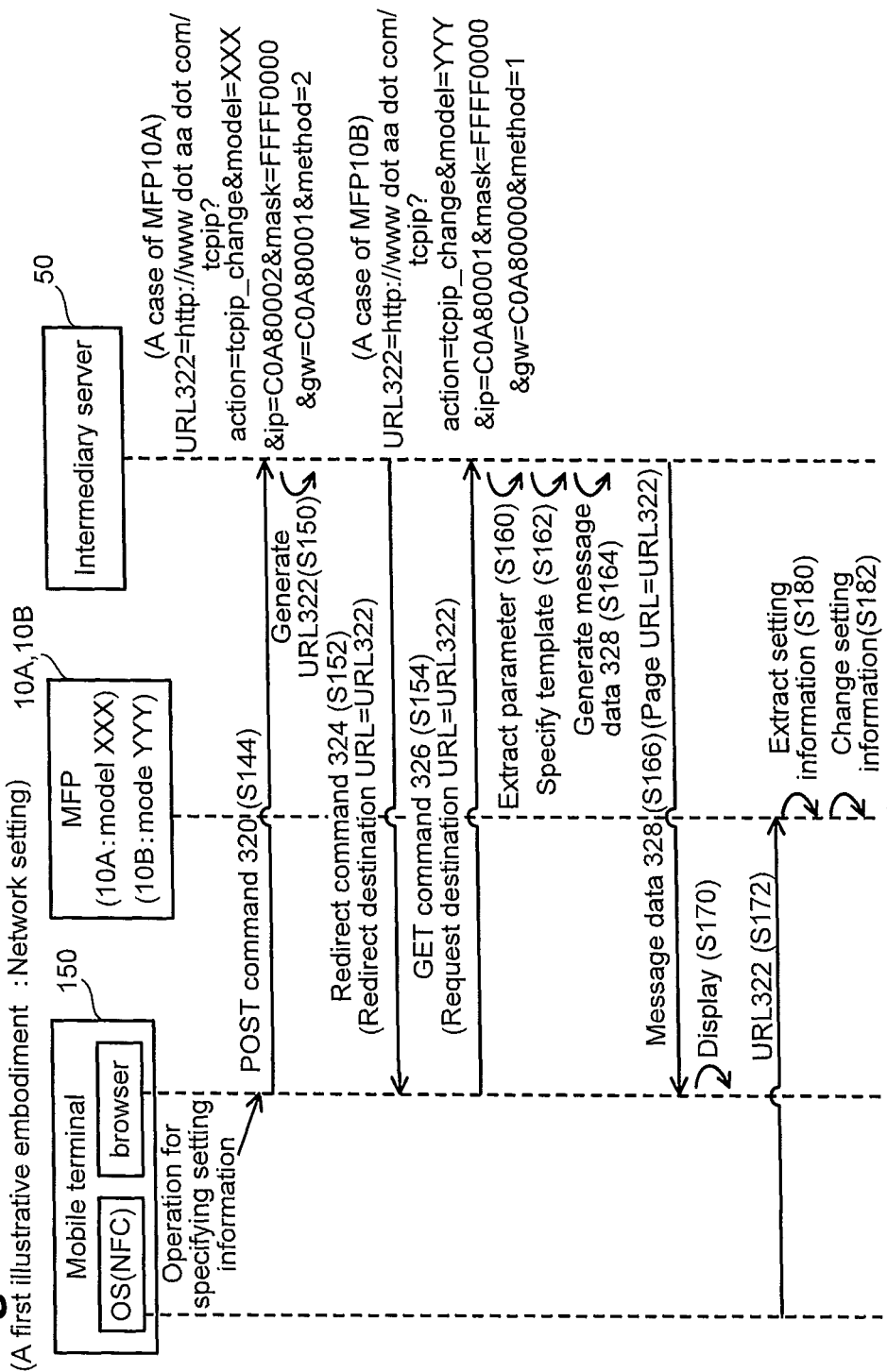

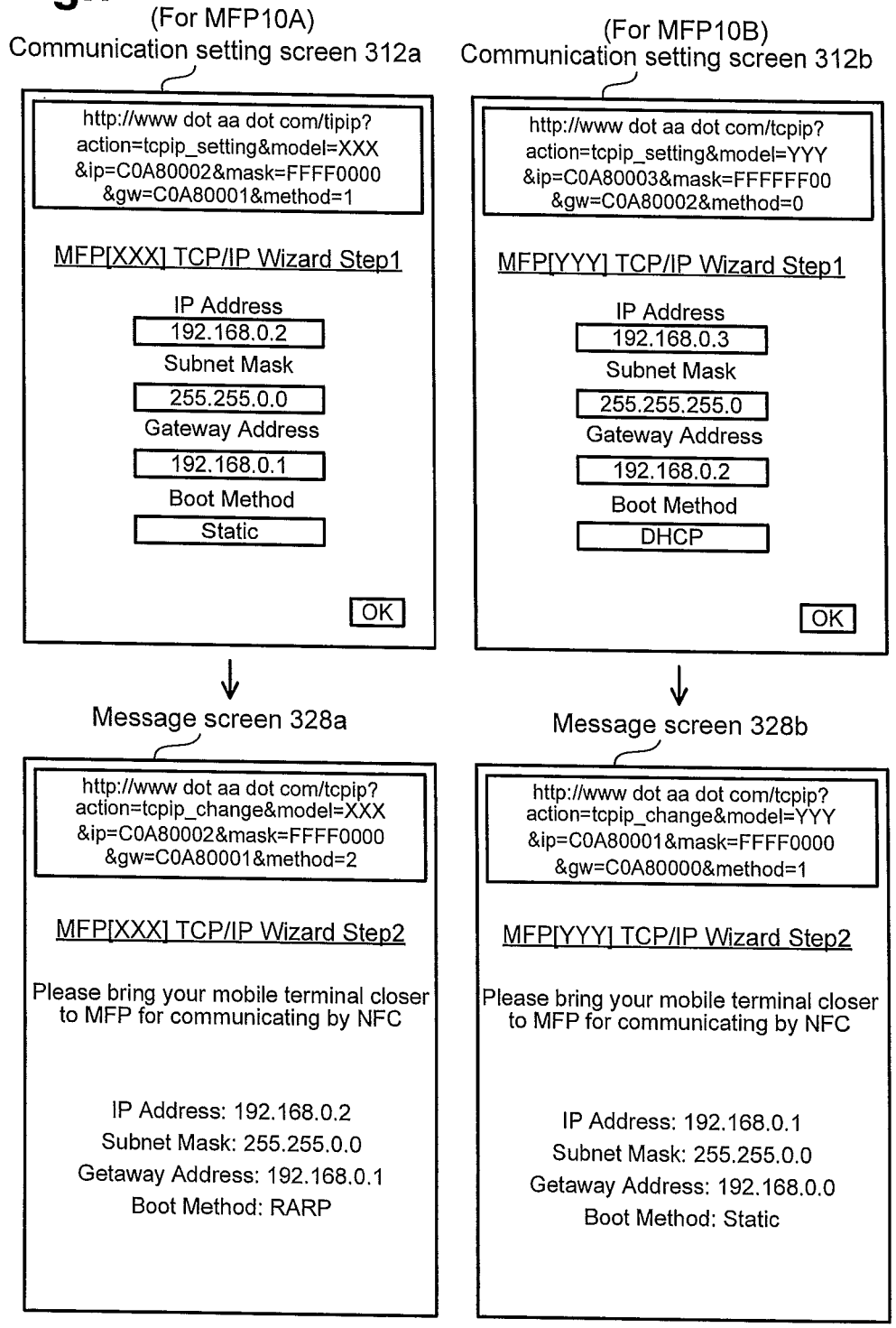

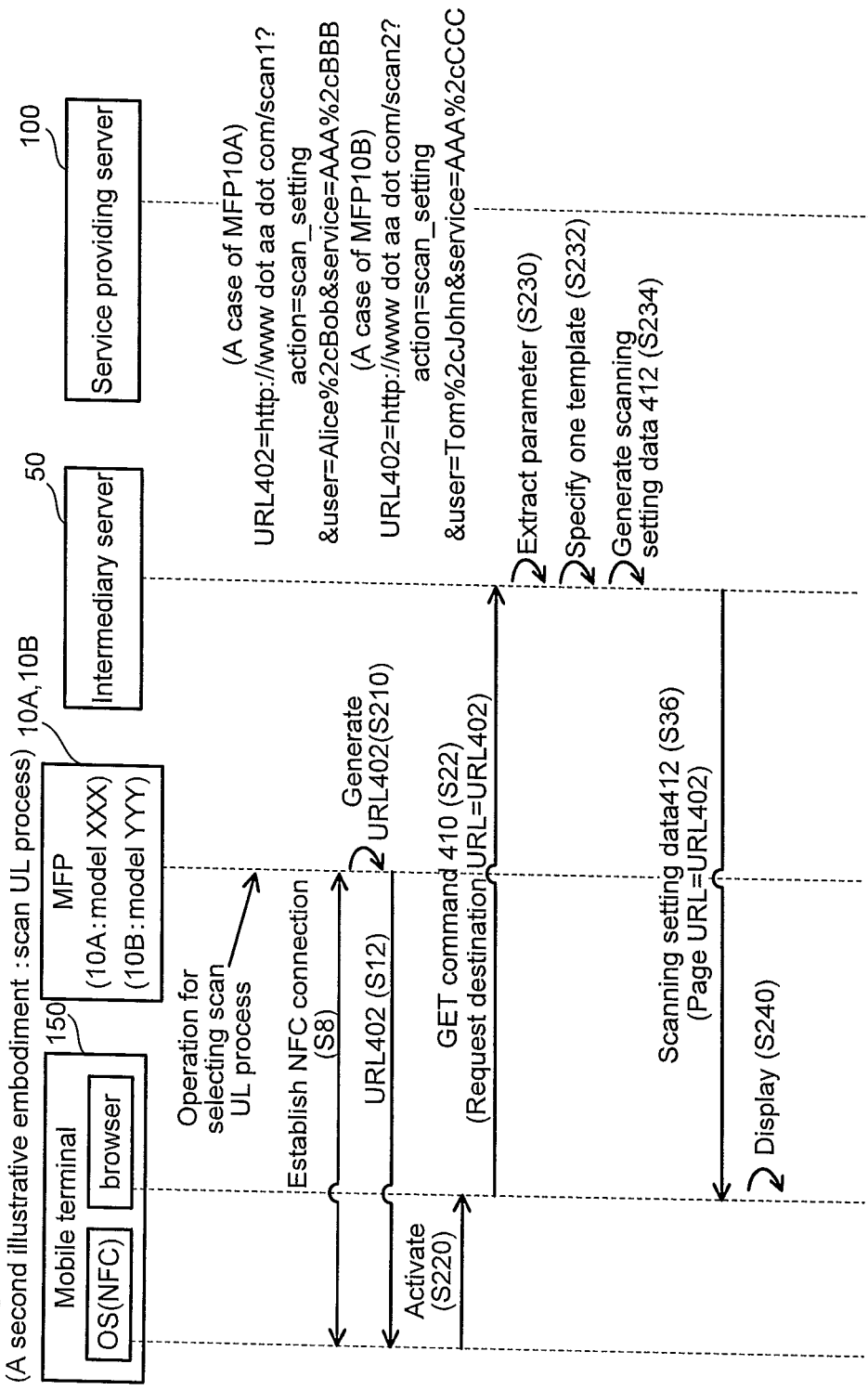

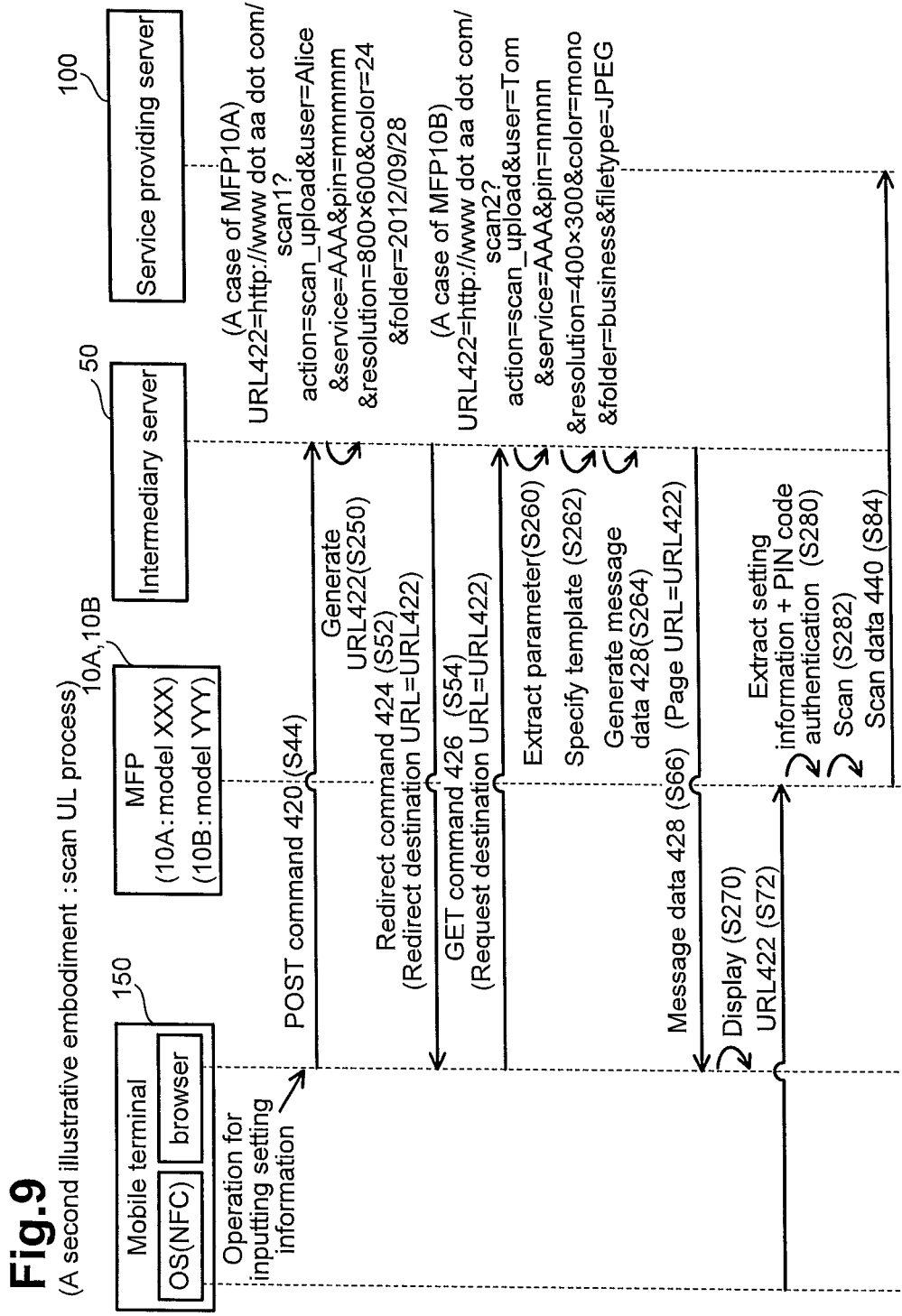

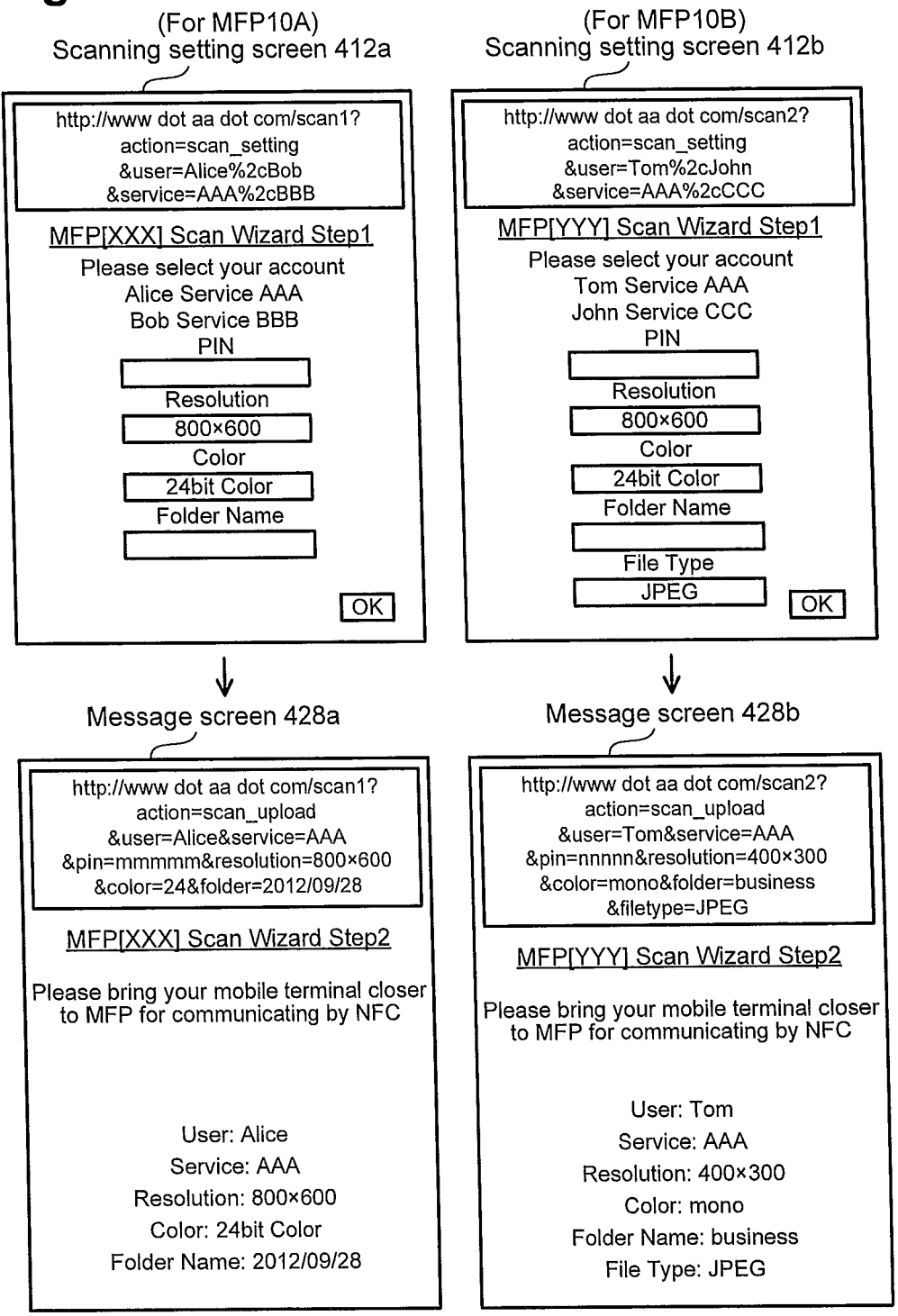

SYSTEM, SERVER, COMMUNICATION DEVICE, AND COMPUTER READABLE MEDIUM THEREFOR

CROSS-REFERENCE TO RELATED APPLICATION

This application claims priority to Japanese Patent Application No. 2012-218126, filed on Sep. 28, 2012, which is incorporated herein by reference.

TECHNICAL FIELD

The specification discloses a server configured to transmit web data to a terminal device, and further discloses a communication device configured to perform wireless communication with the terminal device.

BACKGROUND

For example, in a known system, communication using Near Field Communication ("NFC") system is performed between a mobile phone and a printing device. The mobile phone performs NFC to acquire information related to the printing device from the printing device. The information related to the printing device includes, for example, text information indicating one or more of an error and a status, and a script program of hypertext markup language ("HTML"). Therefore, the mobile phone can display the information related to the printing device thereon.

SUMMARY

However, when the mobile phone acquires information related to a printing device as a result of NFC, the mobile phone has to install a special application for interpreting the acquired information in order to display the information. In other words, the special application can perform a process for interpreting and displaying the information acquired via NFC. In present disclosures, the mobile phone can obtain this information by accessing a server instead of having special application installed on the mobile phone.

Embodiments presented herein provides for novel techniques of displaying information related to a communication device on a terminal device appropriately.

One exemplary embodiment of the present disclosure is a system comprises a communication device and a server. The communication device comprises a first processor and a first memory. The first memory is configured to store first setting information indicating setting of the communication device, and first computer-readable instructions therein. The first computer-readable instructions, when executed by the first processor, cause the communication device to establish short-range wireless communication between a terminal device and the communication device. The first computer-readable instructions further cause the communication device to transmit, to the terminal device using a protocol configured to be used by a browser of the terminal device, the first setting information for specifying new setting information, the transmit performed using the short-range wireless communication. The first setting information is configured to be in a format for transmission using the protocol. The server comprises a second processor and a second memory. The second memory is configured to store setting information configured to be set in the communication device, and second computer-readable instructions therein. The second computer-readable instructions, when executed by the second processor, cause the server to receive, from the terminal device, a request including the first setting information using the protocol. The second computer-readable instructions further cause the server to generate, in response to receiving the request, first specific data comprising a first location information for location of first web data configured to display a message screen for specifying new setting information including the first setting information for the communication device. The first specific data is configured to be in a format for transmission using the protocol. The second computer-readable instructions cause the server to transmit the first specific data to the terminal device using the protocol. The second computer-readable instructions cause the server to receive, from the terminal device, the new setting information using the protocol. The second computer-readable instructions cause the server to generate, in response to receiving the new setting information, a second specific data comprising second location information for location of second web data configured to display one or more instructions for transmitting the new setting information from the terminal device to the communication device using the short-range wireless communication. The second specific data is configured to be in the format. The second computer-readable instructions cause the server to transmit the second specific data to the terminal device using the protocol. The first computer-readable instructions cause the communication device to receive using the protocol, from the terminal device, the second specific data comprising the new setting information, and the receive performed using the short-range wireless communication. The first computer-readable instructions cause the communication device to perform a process for setting the new setting information.

Another exemplary embodiment of the disclosure is to provide a non-transitory computer-readable storage medium storing computer readable instructions therein. The computer-readable instructions, when executed by a processor of a server configured to store setting information configured to be set in a communication device, cause the server to receive, from a terminal device, a request including first setting information indicating a setting of the communication device using a protocol configured to be used by a browser of the terminal device. The computer-readable instructions further cause the server to generate, in response to receiving the request, first specific data. The first specific data comprises a first location information for location of first web data configured to display a message screen for specifying new setting information including the first setting information for the communication device. The first specific data is configured to be in a format for transmission using the protocol. The computer-readable instructions cause the server to transmit the first specific data to the terminal device using the protocol, and receive, from the terminal device, the new setting information using the protocol. The computer-readable instructions cause the server to generate, in response to receiving the new setting information, a second specific data. The second specific data comprises second location information for location of second web data configured to display one or more instructions for transmitting the new setting information from the terminal device to the communication device using a short-range wireless communication. The second specific data is configured to be in a format for transmission using the protocol. The computer-readable instructions cause the server to transmit the second specific data to the terminal device using the protocol.

A further exemplary embodiment of the disclosure is to provide a communication device comprises a processor and a memory. The memory is configured to store first setting information indicating setting of the communication device. The memory is configured to store computer-readable instructions therein. The computer-readable instructions, when executed by the processor, cause the communication device to establish short-range wireless communication between a terminal device and the communication device. The computer-readable instructions cause the communication device to transmit, to the terminal device using a protocol configured to be used by a browser of the terminal device, the first setting information for specifying new setting information, and the transmit is performed using the short-range wireless communication. The first setting information is configured to be in a format for transmission using the protocol. The computer-readable instructions cause the communication device to receive using the protocol, from the terminal device, second specific data. The second specific data comprises the new setting information, and the receive is performed using the short-range wireless communication. The second specific data is configured to be in a format for transmission using the protocol. The computer-readable instructions cause the communication device to perform a process for setting the new setting information.

BRIEF DESCRIPTION OF THE DRAWINGS

For a more complete understanding of the present disclosure, and the objects, features, and advantages thereof, reference now is made to the following descriptions taken in connection with the accompanying drawings.

FIG. 2 is a sequence diagram depicting operations performed by each device during a scanning and uploading process performed by a multifunction peripheral in the first illustrative embodiment according to one or more aspects of the disclosure.

FIG. 3 is a continuation of the sequence diagram in FIG. 2 in the first illustrative embodiment according to one or more aspects of the disclosure.

FIG. 4 illustrates examples of a scanning settings screen and a message screen in the first illustrative embodiment according to one or more aspects of the disclosure.

FIG. 6 is a continuation of the sequence diagram in FIG. 5 in the first illustrative embodiment according to one or more aspects of the disclosure.

FIG. 7 illustrates examples of a communication settings screen and a message screen in the first illustrative embodiment according to one or more aspects of the disclosure.

FIG. 8 is a sequence diagram depicting operations performed by each device during a scanning and uploading process performed by the multifunction peripheral in the second illustrative embodiment according to one or more aspects of the disclosure.

FIG. 9 is a continuation of the sequence diagram in FIG. 8 in the second illustrative embodiment according to one or more aspects of the disclosure.

FIG. 10 illustrates examples of a scanning settings screen and a message screen in a second illustrative embodiment according to one or more aspects of the disclosure.

DESCRIPTION OF EXEMPLARY EMBODIMENTS

Figure 1:
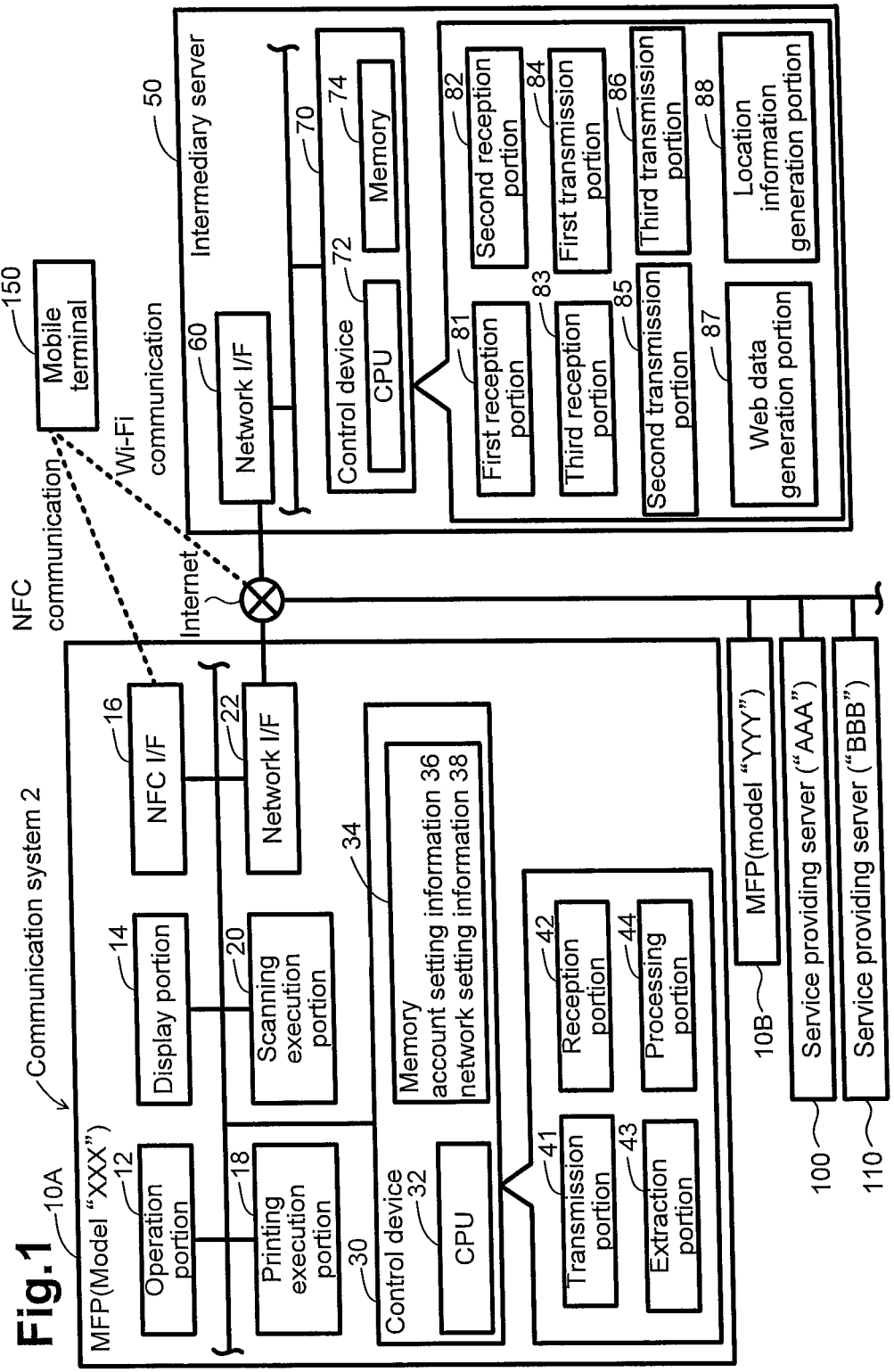
FIG. 1 illustrates a configuration of a communication system in a first illustrative embodiment according to one or more aspects of the disclosure.

A first illustrative embodiment will be described below. As depicted in FIG. 1, a communication system 2 comprises a plurality of multifunction peripherals ("MFPs") 10A and 10B, an intermediary server 50, a plurality of service providing servers 100 and 110, and a mobile terminal 150. Each of the devices 10A, 10B, 50, 100, 110, and 150 is configured to be accessible to the Internet. Further, each of the MFPs 10A and 10B and the mobile terminal 150 is configured to perform NFC.

The MFP 10A is a peripheral device configured to perform multiple functions, such as one or more of a printing function, a scanning function, a copying function, and a facsimile function. The MFP 10A is a model having a model name "XXX". The MFP 10A comprises an operation portion 12, a display portion 14, an NFC interface ("I/F") 16, a printing execution portion 18, a scanning execution portion 20, a network interface ("I/F") 22, and a control device 30. The operation portion 12 comprises a plurality of keys. A user is allowed to input various instructions into the MFP 10A by operating the operation portion 12. The display portion 14 comprises a display configured to display various information thereon. The printing execution portion 18 comprises a printing mechanism of one of an inkjet type and a laser type. The scanning execution portion 20 comprises a scanning mechanism using one of a charged-coupled device ("CCD") and a contact image sensor ("CIS").

The NFC I/F 16 is configured to enable the MFP 10A to perform wireless communication using an NFC method. The NFC standard is one of wireless communication methods for so-called short-range wireless communication and in compliance with the International standards, e.g., ISO/IEC 21481 and ISO/IEC 18092. The network I/F 22 is configured to enable the MFP 10A to connect to a local area network ("LAN"). The network I/F 22 is configured to enable the MFP 10A to connect to one of a wired LAN and a wireless LAN. The MFP 10A is configured to be accessible to the Internet via the network I/F 22 (i.e., the LAN).

The control device 30 comprises a central processing unit ("CPU") 32 and a memory 34. The CPU 32 is configured to perform various processing in accordance with programs stored in the memory 34. Each function of a transmission portion 41, a reception portion 42, an extraction portion 43, and a processing execution portion 44 is implemented by the CPU 32 to perform processing in accordance with the programs. The memory 34 is configured to store various settings information, such as account settings information 36 and network settings information 38, as well as the programs.

The account settings information 36 comprises one or more pieces of user information. The one or more pieces of user information are one or more pieces of information corresponding to one or more users who are allowed to obtain service from one of the service providing servers 100 and 110. A user name, a service name, an access token, and a Personal Identification Number ("PIN") code are associated with each piece of the one or more user information. The service name is a name of a service providing server (e.g., the service providing server 100) from which the user can obtain service.

The access token is authentication information granted by a service providing server (e.g., the service providing server 100) and is used for authentication in the service providing server. The PIN code is specified by the user and is used for authentication (e.g., authentication in step S80 in FIG. 3) in the MFP 10A. A manner in which the account settings information 36 is stored in the memory 34 will be described later.

The MFP 10A stores the account settings information 36. Therefore, the MFP 10A is allowed to obtain service from a service providing server (e.g., the service providing server 100). For example, the MFP 10A is allowed to upload image data generated by scanning to the service providing server (hereinafter, referred to as a "scanning and uploading process": "scan UL process"). That is, the MFP 10A is configured to perform the scanning and uploading process in response to data storage service offered by the service providing server. Further, the MFP 10A is configured to download image data from the service providing server and print an image represented by the image data onto a printing medium (hereinafter, referred to as a "downloading and printing process"). That is, the MFP 10A is configured to perform the downloading and printing process in response to data supply service offered by the service providing server.

The network settings information 38 is used by the MFP 10A to perform communication with another device via the network I/F 22. More specifically, the network settings information 38 comprises an IP address, a subnet mask, a gateway address, and an IP address assignment method. The MFP 10A of the model name "XXX" supports three methods, for example, a dynamic host configuration protocol ("DHCP") method, a static method, and a reverse address resolution protocol ("RARP") method, as the IP address assignment method. In the DHCP method, an IP address is assigned by a DHCP server. In the static method, an IP address specified by the user of the MFP 10A is assigned. In the RARP method, an IP address is assigned by an RARP server.

The MFP 10B is a device manufactured by the same vender that manufactures the MFP 10A. Nevertheless, the MFP 10B is another model that is different from the MFP 10A and has a model name "YYY". The MFP 10B has the same configuration as the MFP 10A. That is, the MFP 10B is also configured to perform NFC and one of wired communication and wireless communication via the LAN. A memory of the MFP 10B stores similar programs to the MFP 10A. Therefore, the MFP 10B comprises portions similar to the portions 41, 42, 43, and 44 of the MFP 10A. The memory of the MFP 10B further stores account settings information and network settings information.

The account settings information stored in the memory of the MFP 10B is different from the account settings information 36 stored in the memory 34 of the MFP 10A because a user of the MFP 10B is different from the user of the MFP 10A. The MFP 10B stores the account settings information as described above. Therefore, the MFP 10B is configured to perform the scanning and uploading process and the downloading and printing process using a service providing server (e.g., the service providing server 100).

The network settings information stored in the memory of the MFP 10B comprises an IP address, a subnet mask, a gateway address, and an IP address assignment method, similar to the network settings information 38 stored in the memory 34 of the MFP 10A. Although the MFP 10B of the model name "YYY" supports the DHCP method and the static method, the MFP 10B does not support the RARP method as the IP address assignment method.

The intermediary server 50 is provided by the vender of the MFPs 10A and 10B. The intermediary server 50 is configured to mediate service from the one or more service providing servers 100 and 110 to the MFPs 10A and 10B. The intermediary server 50 functions as a Web server configured to provide web data to the mobile terminal 150. The intermediary server 50 comprises a network interface ("I/F") 60 and a control device 70. The intermediary server 50 is configured to be accessible to the Internet via the network I/F 60.

The control device 70 comprises a CPU 72 and a memory 74. The CPU 72 is configured to perform various processing in accordance with programs stored in the memory 74. Each function of a first reception portion 81, a second reception portion 82, a third reception portion 83, a first transmission portion 84, a second transmission portion 85, a third transmission portion 86, a web data generation portion 87, and a location information generation portion 88 is implemented by the CPU 72 to perform processing in accordance with the programs. The memory 74 is configured to store a plurality of templates for generating web data, as well as the programs. The plurality of templates will be described in detail later.

Examples of service providing server 100, 110, "Evernote® (Evernote® is a registered trademark owned by Evernote Corporation of Redwood City, Calif.)", "Google Docs™ (Google Docs™ is a trademark owned by Google Inc. of Mountain View, Calif.)" "PICASA® (PICASA® is a registered trademark owned by Google Inc. of Mountain View, Calif.)", and "Facebook®" (Facebook® is a registered trademark owned by Facebook, Inc. of Menlo Park, Calif.)". In the illustrative embodiment, names of the service providing servers 100 and 110 (i.e., a service name) are "AAA" and "BBB", respectively. Each of the service providing server 100 and 110 is configured to offer one or more of data supply service for supplying data to a communication device (e.g., the MFP 10A) and data storage service for storing data acquired from a communication device.

The service providing server 100 is provided by a first service provider (i.e., a first company). The service providing server 110 is provided by a second service provider (i.e., a second company) that is a different company from the first service provider. The first service provider opens its first application programming interface ("API") to a communication device such that the communication device becomes enabled to obtain service from the service providing server 100. The second service provider also opens its second API to a communication device such that the communication device becomes enabled to obtain service from the service providing server 110. The first service provider is a different company from the second service provider. Therefore, generally, the first API and the second API are different from each other. A communication device needs to support both of the first and second APIs to obtain service from both of the service providing servers 100 and 110, for example. That is, the communication device needs to be equipped with both a program for using the first API and a program for using the second API.

Accordingly, to obtain service from a plurality of service providing servers, e.g., the service providing servers 100 and 110, the MFP 10A needs to support a plurality of APIs. Therefore, the MFP 10A needs to store a plurality of programs in the memory 34. However, generally, a storage capacity of the memory 34 of the MFP 10A is less than a storage capacity of a memory of a personal computer ("PC"). Therefore, in the first illustrative embodiment, the intermediary server 50 is provided to enable the MFP 10A to obtain service from the plurality of service providing servers, e.g., the service providing servers 100 and 110, without storing large numbers of programs in the memory 34 of the MFP 10A.

That is, the intermediary server 50 is configured to support a plurality of APIs for the plurality of service providing servers, e.g., the service providing servers 100 and 110. The intermediary server 50 is configured to perform communication (e.g., communication to acquire an access token) with one or more of the service providing servers 100 and 110 using an appropriate one of the APIs of the service providing servers 100 and 110 in order to enable each of the MFPs 10A and 10B to obtain service from one or more of the service providing servers 100 and 110. Thus, each of the MFPs 10A and 10B can obtain service from one or more of the service providing servers 100 and 110 although the MFPs 10A and 10B do not support the APIs for the service providing servers 100 and 110 (i.e., the MFPs 10A and 10B do not store the plurality of programs therein). Further, when specifications of one or more of the service providing servers 100 and 110 are changed, the only requirement is to change the program of the intermediary server 50. With the change of the program of the intermediary server 50, the MFPs 10A and 10B can respond to the specification change of one or more of the service providing servers 100 and 110 without changing the programs of the MFPs 10A and 10B. Furthermore, the program of the intermediary server 50 is changed to support one or more APIs of one or more new service providing servers. With this program change in the intermediary server 50, the MFPs 10A and 10B become enabled to obtain service from one or more of the new service providing servers without changing the programs of the MFPs 10A and 10B.

The mobile terminal 150 is a portable terminal device. The portable terminal device comprises, for example, a mobile phone (e.g., a smartphone), a personal digital assistant ("PDA"), a notebook PC, a tablet PC, a portable audio player, and a portable video player. The mobile terminal 150 comprises an interface for performing NFC and an interface for wireless communication in compliance with a wireless communication standard created by the Wi-Fi Alliance. Hereinafter, wireless communication is referred to as "Wi-Fi communication". The mobile terminal 150 is configured to perform Wi-Fi communication to access the Internet. In the first illustrative embodiment, it is assumed that the mobile terminal 150 is connected to a LAN that is different from the LAN to which the MFPs 10A and 10B are connected.

Here, difference between NFC and Wi-Fi communication is described. NFC is wireless communication in compliance with the International standards, e.g., ISO/IEC 21481 and ISO/IEC 18092, as described above. Wi-Fi communication is, for example, wireless communication in compliance with the standard IEEE 802.11 and its family standards (e.g., IEEE 802.11a, 802.11b, 802.11g, 802.11n) (IEEE stands for The Institute of Electrical and Electronics Engineers, Inc.). A communication speed (e.g., a maximum communication speed=100 to 424 Kbps) of NFC is typically slower than a communication speed (e.g., a maximum communication speed=11 to 600 Mbps) of Wi-Fi communication. A frequency of a carrier (e.g., 13.56 MHz band) in NFC is different from a frequency of a carrier (e.g., 2.4 GHz band or 5.0 GHz band) in Wi-Fi communication. A communicable range of NFC (e.g., 10 cm or shorter) is shorter than a communicable range of Wi-Fi communication (e.g., 100 m or shorter). HTTP communication, that is, communication using HTTP protocol, can be performed using Wi-fi communication.

The mobile terminal 150 comprises a known operating system ("OS") program (e.g., Android™ operating system (Android™ is a trademark owned by Google Inc. of Mountain View, Calif.)) that supports both NFC and Wi-Fi communication. The mobile terminal 150 further comprises or stores a known Web browser program. In the first illustrative embodiment, the mobile terminal 150 does not comprise a special application program (e.g., a printer driver program or a scanner driver program) for enabling the MFPs 10A and 10B to perform one or more of the functions (e.g., the printing function and the scanning function).

For example, a user of the MFP 10A (hereinafter, referred to as a "specific user") needs to prepare the MFP 10A in order to obtain service from each of the service providing servers 100 and 110 as described below. The specific user accesses the intermediary server 50 by using a PC (not depicted) and selects, for example, the service name "AAA" of the service providing server 100. Then, the specific user selects "Acquire access token". In response to this, the intermediary server 50 transmits, to the PC, a specific URL (Uniform Resource Locator) for allowing the MFP 10A to access the service providing server 100. Then, the specific user accesses the service providing server 100 using the specific URL from the PC. Thus, the PC displays thereon a login screen prompting the specific user to log in to the service providing server 100. Then, the specific user inputs an account name and a password to perform an authentication procedure through the PC. When authentication succeeds, the service providing server 100 generates an access token for the specific user and transmits the access token to the intermediary server 50. Upon receipt of the access token for the specific user from the service providing server 100, the intermediary server 50 generates a temporary ID and transmits the temporary ID to the PC. Thus, the temporary ID is displayed on the PC. Therefore, the specific user can acquire the temporary ID displayed on the PC.

After that, the specific user selects the service name "AAA" of the service providing server 100 by operating the operation portion 12 of the MFP 10A. Further, the specific user inputs a user name (e.g., "Alice") of the specific user that is used on the MFP 10A, and a PIN code into the MFP 10A. Then, the specific user inputs the temporary ID displayed on the PC into the MFP 10A by operating the operation portion 12 of the MFP 10A. In response to this, the MFP 10A transmits the temporary ID to the intermediary server 50. Then, the intermediary server 50 transmits the access token to the MFP 10A.

As the above processing is performed, the MFP 10A becomes able to add a piece of user information to the account settings information 36. That is, the MFP 10A is able to newly store a piece of user information in the memory 34. The user name (e.g., "Alice") inputted by the specific user, the service name "AAA" selected by the specific user, the access token received from the intermediary server 50, and the PIN code inputted by the specific user are associated with the user information to be stored in the memory 34.

Similar to this above-mentioned matter, the MFP 10A is also configured to store user information corresponding to the service providing server 110. The MFP 10B is also configured to store user information corresponding to each of the service providing servers 100 and 110.

Referring to FIG. 2, details of each processing performed to allow the MFP 10A to perform the scanning and uploading process that is instructed by a user of the mobile terminal 150 using the mobile terminal 150 will be described. Hereinafter, the processing performed to allow the MFP 10A to perform the scanning and uploading process will be described, and processing performed to allow the MFP 10B to perform the scanning and uploading process are also performed in a similar manner.

When the user of the mobile terminal 150 desires to allow the MFP 10A to perform the scanning and uploading process, first, the user of the mobile terminal 150 operates the operation portion 12 of the MFP 10A. Then, the user of the mobile terminal 150 selects an option indicating "scanning and uploading" on a menu screen of the display portion 14 of the MFP 10A. Hereinafter, this operation is referred to as a "scanning and uploading selection operation".

Then, the user brings the mobile terminal 150 closer to the MFP 10A to establish an NFC connection between the mobile terminal 150 and the MFP 10A. While the power of the MFP 10A is on, the NFC I/F 16 of the MFP 10A issues detection radio waves to detect a device that can perform NFC (e.g., the mobile terminal 150). An NFC I/F (not depicted) of the mobile terminal 150 also issues detection radio waves to detect a device that can perform NFC (e.g., the MFP 10A). When a distance between the MFP 10A and the mobile terminal 150 becomes a distance that their detection radio waves are received at each other devices or shorter (e.g., 10 cm), one of the MFP 10A and the mobile terminal 150 receives radio waves from the other of the MFP 10A and the mobile terminal 150 and transmits response radio waves to the other of the MFP 10A and the mobile terminal 150. Thus, in step S8 of FIG. 2, an NFC connection is established between the MFP 10A and the mobile terminal 150.

When the above-described scanning and uploading selection operation is performed, the control device 30 of the MFP 10A activates a scanning and uploading program for generating and transmitting a URL 202. When an NFC connection is established between the MFP 10A and the mobile terminal 150, in step S10 of FIG. 2, the control device 30 generates the URL 202 in accordance with the scanning and uploading program.

A URL "FOR MFP 10A" depicted in FIG. 2 represents an example of the URL 202 generated by the control device 30 of the MFP 10A. In the first illustrative embodiment, in a URL (e.g., the URL 202), a part preceding "?" is referred to as a "domain part" and a part including and subsequent to "?" is referred to as a "query part". In the domain part (e.g., "http://www$_{dot}$aa$_{dot}$com/scan"), a part (e.g., "www$_{dot}$aa$_{dot}$com") between a character string "http://" representing a protocol and a first slash "/" is referred to as a "server name". In the domain part, a part (e.g., "scan") subsequent to the server name is referred to as a "resource part". In reality, the resource part includes an extension such as ".cgi". Nevertheless, the extension such as ".cgi" is omitted from the description and drawings in the first illustrative embodiment.

The domain part of the URL 202 comprises a server name "www$_{dot}$aa$_{dot}$com" of the intermediary server 50. That is, the domain part of the URL 202 indicates a location in the intermediary server 50. The domain part of the URL 202 further comprises a resource part "scan" to allow the intermediary server 50 to perform processing related to the scanning and uploading process (e.g., steps S30 to S34 in FIG. 2 and steps S60 to S64 in FIG. 3) but not processing related to a settings change process (e.g., steps S130 to S134 in FIG. 5 and steps S160 to S164 in FIG. 5). The control device 30 acquires a predetermined domain part "http://www$_{dot}$aa$_{dot}$com/scan" from the memory 34.

Then, the control device 30 generates a query part. More specifically, the control device 30 acquires an action parameter (i.e., a character string) "action=scan_setting" for allowing the intermediary server 50 to perform a process in which scanning settings data is generated (e.g., steps S30 to S34 in FIG. 2) from the memory 34. Next, the control device 30 acquires a model parameter "model=XXX" representing the model name of the MFP 10A from the memory 34.

The control device 30 further acquires the account settings information 36 stored in the memory 34. As described above, each piece of user information in the account settings information 36 comprises the user name, the service name, the access token, and the PIN code. The control device 30 extracts the user name and the service name from each piece of user information in the account settings information 36. Then, the control device 30 generates a user parameter and a service parameter using the extracted user name and service name. For example, first user information comprises the user name "Alice" and the service name "AAA", and second user information comprises a user name "Bob" and the service name "BBB". In this case, the control device 30 generates a user parameter "user=Alice%2cBob" and a service parameter "service=AAA%2cBBB". Characters "%2c" represents a comma converted using percent-encoding to indicate the comma in a URL.

The control device 30 combines the action parameter, the model parameter, the user parameter, and the service parameter to generate a query part. Then, the control device 30 combines the domain part and the query part to generate the URL 202.

Similar to the MFP 10A, the control device (not depicted) of the MFP 10B is configured to generate the URL 202 (see a URL "FOR MFP 10B" depicted in FIG. 2). A domain part of the URL 202 generated by the MFP 10B is the same as the domain part of the URL 202 generated by the MFP 10A. Nevertheless, the model name (e.g., the model name "YYY") of the MFP 10B is different from the model name (e.g., the model "XXX") of the MFP 10A. The account settings information of the MFP 10B is also different from the account settings information 36 of the MFP 10A. Therefore, a query part of the URL 202 generated by the MFP 10B is different from the query part of the URL 202 generated by the MFP 10A.

When an NFC connection is established between the MFP 10A and the mobile terminal 150, in step S12 of FIG. 2, the transmission portion 41 of the MFP 10A transmits the generated URL 202 to the mobile terminal 150 using the established NFC connection. That is, the transmission portion 41 of the MFP 10A transmits the generated URL 202 to the mobile terminal 150 via NFC.

In step S20 of FIG. 2, upon receipt of the URL 202 as a result of NFC, the OS program of the mobile terminal 150 activates a Web browser of the mobile terminal 150. Such a Web browser activate mechanism is preinstalled in the OS program. Therefore, the OS program of the mobile terminal 150 can activate the Web browser without a special application program installed on the mobile terminal 150. When the mobile terminal 150 receives data (e.g., text data or web data) that is different from a URL as a result of NFC, the mobile terminal 150 requires installation of a special application program to display information represented by the data.

The Web browser of the mobile terminal 150 accesses the URL 202. Hereinafter, the OS program of the mobile terminal 150 and the browser program of the mobile terminal 150 are referred to as a "mobile terminal 150 (OS)" and a "mobile terminal 150 (browser)", respectively. Next, a method by which the mobile terminal 150 (browser) accesses the URL 202 will be described.

The mobile terminal 150 (browser) acquires an IP address of the intermediary server 50 from a Domain Name System ("DNS") server using the server name "www$_{dot}$aa$_{dot}$com" comprised in the domain part "http://www$_{dot}$aa$_{dot}$com/scan" of the URL 202. Then, the mobile terminal 150 (browser) generates a GET command 210 of a hypertext transfer protocol ("HTTP") comprising the acquired IP address as a sending-destination IP address. The GET command 210 comprises a string of all characters including and subsequent to "/scan" of the URL 202. That is, the GET command 210 comprises the resource part and the query part. Therefore, the GET command 210 comprises the IP address of the intermediary server 50 and the string of characters including and subsequent to "/scan" of the URL 202, and strictly speaking, the GET command 210 does not comprise the exact URL 202. The IP address of the intermediary server 50 can be acquired by which the server name "www$_{dot}$aa$_{dot}$com" is changed. Therefore, the IP address of the intermediary server 50 is information that is equivalent to the server name "www$_{dot}$aa$_{dot}$com". Thus, it could be suggested that a situation where the GET command 210 comprises the IP address of the intermediary server 50, and the character string comprising part including and subsequent to "/scan" of the URL 202 is equivalent to a situation where the GET command 210 comprises the exact URL 202. Accordingly, in the first illustrative embodiment, it may be expressed that "the GET command comprises the URL" under a situation where a device (e.g., the mobile terminal 150) accesses a URL to transmit a GET command although the GET command does not actually comprise the exact URL.

The mobile terminal 150 (browser) generates the GET command 210 comprising the URL 202 as a request destination URL. The URL 202 comprises the server name "www$_{dot}$aa$_{dot}$com" of the intermediary server 50. That is, the URL 202 indicates a location in the intermediary server 50. Therefore, in step S22 of FIG. 2, the mobile terminal 150 (browser) performs Wi-Fi communication to transmit the GET command 210 to the intermediary server 50 using HTTP communication. Thus, the mobile terminal 150 (browser) becomes able to access the URL 202.

The first reception portion 81 of the intermediary server 50 receives the GET command 210 from the mobile terminal 150 (browser) using HTTP communication. In response to this, the control device 70 of the intermediary server 50 performs processing of steps S30 to S34 of FIG. 2 in accordance with a program corresponding to the resource part "scan" of the URL 202 comprised in the GET command 210.

In step S30 of FIG. 2, the web data generation portion 87 of the intermediary server 50 extracts each parameter comprised in the query part of the URL 202 comprised in the GET command 210.

In step S32 of FIG. 2, the web data generation portion 87 specifies one scanning-and-uploading template among a plurality of scanning-and-uploading templates stored in the memory 74, using the extracted action parameter (e.g., "action=scan_setting") and the extracted model parameter (e.g., "model=XXX").

The plurality of scanning-and-uploading templates stored in the memory 74 comprises a scanning-and-setting ("SS") template, and a scanning-and-message ("SM") template. The SS template is for generating scanning settings data representing one of scanning settings screens 212a and 212b depicted in FIG. 4. The SM template is for generating message data representing one of message screens 228a and 228b depicted in FIG. 4. The plurality of scanning-and-uploading templates comprises an SS template and an SM template for each MFP model. Therefore, for example, when two models "XXX" and YYY" are present as in the first illustrative embodiment, the plurality of scanning-and-uploading templates comprises an SS template for the model name "XXX", an SM template for the model name "XXX", an SS template for the model name "YYY", and an SM template for the model name "YYY". Hereinafter, the SS template for the model name "XXX" is referred to as an "SS template (XXX)", and other templates are also referred in the same manner.

The SS template (XXX) is for generating scanning settings data representing the scanning settings screen 212a depicted in FIG. 4. The SS template (YYY) is for generating scanning settings data representing the scanning settings screen 212b depicted in FIG. 4. The SS template (XXX) comprises a character string "MFP[XXX] Scan Wizard Step 1" representing the model name "XXX". The SS template (YYY) comprises a character string "MFP[YYY] Scan Wizard Step 1" representing the model name "YYY". In this respect, the SS template (XXX) and the SS template (YYY) are different from each other.

The SS template (YYY) comprises a box (e.g., File Type) in which a file type is specified, and the SS template (XXX) does not comprise such a box. In this respect, also, the SS template (XXX) and the SS template (YYY) are different from each other. There are differences between the SS template (XXX) and the SS template (YYY) because of the following reasons. The MFP 10B of the model name "YYY" has a function of generating scan data having a file type specified by the user, but the MFP 10A of the model name "XXX" does not have such a function. The scan data having the file type specified by the user is, for example, image data acquired by scanning.

Each of the SS template (XXX) and the SS template (YYY) further comprises a box (e.g., PIN) in which a PIN code is inputted, a box (e.g., Resolution) in which a scan resolution is specified, a box (e.g., Color) in which a number of colors is specified, and a box (e.g., Folder Name) in which a folder name is inputted. In FIG. 4, no information is inputted in the PIN code box and the folder name box, that is, the PIN code box and the folder name box are blank. The PIN code box is used to input a PIN code to be used in authentication in step S80 of FIG. 3. The folder name box is used to input a folder name in which image data acquired by scanning is to be stored.

Predetermined values are described in the scan resolution box and the color number box, respectively. The scan resolution available for the MFP 10A of the model name "XXX" is different from the scan resolution available for the MFP 10B of the model name "YYY". Therefore, options (e.g., 400×300 (dpi) and 800×600 (dpi)) that can be specified in the scan resolution box of the SS template (XXX) are different from options (e.g., 400×300 (dpi), 800×600 (dpi), and 1600×600 (dpi)) that can be specified in the scan resolution box of the SS template (YYY). Similar to this, options that can be specified in the color number box of the SS template (XXX) are different from options that can be specified in the color number box of the SS template (YYY). In this respect, the SS template (XXX) and the SS template (YYY) are different from each other.

The SM template (XXX) is for generating message data representing the message screen 228a depicted in FIG. 4. The SM template (YYY) is for generating message data representing the message screen 228b depicted in FIG. 4. Each of the SM template (XXX) and the SM template (YYY) comprises a character string (e.g., "MFP[XXX] Scan Wizard Step 2") representing the model name. The SS template (YYY) comprises a field in which a file type is described, but the SS template (XXX) does not comprise such a field. In this respect, the SM (XXX) and the SM template (YYY) are different from each other.

In step S32 of FIG. 2, the web data generation portion 87 determines that the SS template, of the SS template and the SM template, is to be used in accordance with the extracted action parameter "action=scan_setting". The web data generation portion 87 further determines that the SS template (XXX), of the SS template (XXX) and the SS template (YYY), is to be used in accordance with the extracted model parameter "model=XXX". Therefore, the web data generation portion 87 can appropriately determine to use the SS template (XXX) for generating the scanning settings screen 212a depicted in FIG. 4 among the plurality of scanning-and-uploading templates.

When the URL 202 comprised in the GET command 210 is generated by the MFP 10B, in step S32 of FIG. 2, the web data generation portion 87 determines to use the SS template (YYY) in accordance with each parameter (i.e., the action parameter "action=scan_setting" and the model parameter "model=YYY") comprised in the URL 202. More specifically, in step S32 of FIG. 2, the web data generation portion 87 determines to use the SS template (YYY) in accordance with the parameters "action=scan_setting" and "model=YYY" in the URL 202. Therefore, the web data generation portion 87 can appropriately determine to use the SS template (YYY) for generating the scanning settings screen 212*b* depicted in FIG. 4 among the plurality of scanning-and-uploading templates.

In step S34 of FIG. 2, the web data generation portion 87 generates scanning settings data 212 using the determined SS template (XXX). The scanning settings data 212 is web data in a format interpretable by the Web browser of the mobile terminal 150. More specifically, the web data generation portion 87 describes character strings with which "Alice" and "service AAA" are associated in the SS template (XXX) based on the extracted user parameter (e.g., "user=Alice%2cBob") and the extracted service parameter (e.g., "service=AAA%2cBBB"). Further, the web data generation portion 87 generate character strings with which "Bob" and "service BBB" are associated in the SS template (XXX). Therefore, the scanning settings data 212 representing the scanning settings screen 212*a* depicted in FIG. 4 is completed.

When the URL 202 comprised in the GET command 210 is generated by the MFP 10B, in step S34 of FIG. 2, the web data generation portion 87 generates the scanning settings data 212 representing the scanning settings screen 212*b* depicted in FIG. 4 based on the SS template (YYY) and each parameter. That is, in step S34 of FIG. 2, the web data generation portion 87 generates the scanning settings data 212 based on the SS template (YYY) and each parameter "user=Tom%2cJohn" and "service=AAA%2cCCC".

Subsequent to steps S30 to S34 in FIG. 2, the first transmission portion 84 of the intermediary server 50 transmits the generated scanning settings data 212 to the mobile terminal 150 (browser) using HTTP communication in step S36 of FIG. 2. The scanning settings data 212 comprises the URL 202 as a page URL of the Web page (e.g., the scanning settings screen 212*a* depicted in FIG. 4). That is, the scanning settings data 212 comprises the same URL as the URL 202 in the GET command 210, as a Web page URL.

In step S40 of FIG. 2, the mobile terminal 150 (browser) displays thereon the scanning settings screen 212*a* (see FIG. 4) represented by the scanning settings data 212. As depicted in FIG. 4, a topmost field on the scanning settings screen 212*a* indicates the URL 202 in the scanning settings data 212. The scanning settings screen 212*a* comprises two pieces of user information (i.e., "Alice service AAA" and "Bob service BBB") currently stored in the MFP 10A. The scanning settings screen 212*a* further comprises a plurality of boxes and an OK button.

As depicted in FIG. 3, the user of the mobile terminal 150 is allowed to specify scanning settings information by operating the mobile terminal 150 while looking at the scanning settings screen 212*a*. That is, the user specifies one piece of user information corresponding to the user himself/herself from the two pieces of user information indicated on the scanning settings screen 212*a*. Hereinafter, the one piece of user information specified at this time is referred to as "specific user-information". The user further specifies one or more pieces of information described below by operating the mobile terminal 150.

The user inputs the PIN code associated with the specific user-information in the PIN code box of the scanning settings screen 212*a*. When a wrong PIN code is inputted, authentication fails in step S80. The user further inputs one of the folder name corresponding to the specific user-information (e.g., "Alice service AAA") of the folder names already stored in the service providing server (e.g., the service providing server 100) and a folder name to be newly generated in the service providing server, in the folder name box. The user specifies one option from a plurality of options regarding the scan resolution in the scan resolution box. The user specifies one option from a plurality of options regarding the number of colors in the color number box.

When the scanning settings screen 212*b* is displayed on the mobile terminal 150, the user further specifies one option from a plurality of options regarding the file type in the file type box.

The user specifies one or more of the specific user-information, the PIN code, the scan resolution, the number of colors, and the folder name as the scanning settings information, and then selects the OK button on the scanning settings screen 212*a*. Thus, the mobile terminal 150 (browser) generates a POST command 220 comprising the scanning settings information and the model name "XXX" of the MFP 10A. Then, the mobile terminal 150 (browser) transmits POST command 220 to the intermediary server 50 via HTTP communication using Wi-Fi communication.

A script for which the mobile terminal 150 (browser) generates the POST command 220 is comprised in the scanning settings data 212 depicted in FIG. 2. That is, when the web data generation portion 87 of the intermediary server 50 generates the scanning settings data 212, the web data generation portion 87 generates the scanning settings data 212 comprising the script. Therefore, in step S44 of FIG. 3, the mobile terminal 150 (browser) can generate and transmit the POST command 220 without a special application installed on the mobile terminal 150.

The second reception portion 82 of the intermediary server 50 receives the POST command 220 from the mobile terminal 150 (browser) using HTTP communication.

Then, in step S50 of FIG. 3, the location information generation portion 88 of the intermediary server 50 generates a URL 222 in accordance with the scanning settings information comprised in the POST command 220. A URL "FOR MFP 10A" depicted in FIG. 3 represents an example of the URL 222 generated by the location information generation portion 88 when the POST command 220 comprising the model name "XXX" is received. The URL 222 comprises the domain part "http://www$_{dot}$aa$_{dot}$com/scan" and the query part (e.g., the part including and subsequent to "?"). The domain part of the URL 222 is the same as the domain part of the URL 202 depicted in FIG. 2. The location information generation portion 88 acquires the predetermined domain part "http://www.aa.com/scan" stored in the memory 74.

After that, the location information generation portion 88 generates a query part. More specifically, the location information generation portion 88 allows the intermediary server 50 to perform processing that is different from the processing according to the URL 202 depicted in FIG. 2 (e.g., steps S30 to S34 in FIG. 2). That is, the location information generation portion 88 acquires, from the memory 74, the action parameter "action=scan_upload" for allowing the intermediary server 50 to perform processing for generating message data 228 (e.g., steps S60 to S64 in FIG. 3). Then, the location information generation portion 88 generates a model parameter "model=XXX" in accordance with the model name "XXX" in the POST command 220.

The location information generation portion 88 further generates an account parameter "user=Alice&service=AAA" in accordance with the specific user-information "Alice" and "AAA" comprised in the POST command 220. The location information generation portion 88 further generates a scanning settings parameter "pin=mmmmm" in accordance with the PIN code, the scan resolution, the number of colors, and the folder name comprised in the POST command 220.

The location information generation portion 88 combines the action parameter, the model parameter, the account parameter, and the scanning settings parameter to generate the query part. Then, the location information generation portion 88 combines the domain part and the query part to generate the URL 222.

A URL "FOR MFP 10B" depicted in FIG. 3 represents an example of the URL 222 generated by the location information generation portion 88 when the POST command 220 comprising the model name "YYY" is received. A method of generating the URL 222 is similar to the above-described method.

Next, the second transmission portion 85 of the intermediary server 50 generates a redirect command 224 of HTTP. The redirect command 224 is for instructing an access to a URL comprised in the redirect command. Then second transmission portion 85 generates the redirect command 224 comprising the URL 222 as a redirect destination URL. Then, in step S52 of FIG. 3, the second transmission portion 85 transmits the redirect command 224 to the mobile terminal 150 (browser) using HTTP communication.

Upon receipt of the redirect command 224, the mobile terminal 150 (browser) accesses the URL 222 in accordance with the redirect command 224. That is, the mobile terminal 150 (browser) generates a GET command 226 comprising the URL 222 as the request destination URL. The URL 222 comprises the server name "www$_{dot}$aa$_{dot}$com" of the intermediary server 50. That is, the URL 222 indicates a location in the intermediary server 50. Therefore, in step S54 of FIG. 3, the mobile terminal 150 (browser) transmits the GET command 226 to the intermediary server 50 using HTTP communication.

The third reception portion 83 of the intermediary server 50 receives the GET command 226 from the mobile terminal 150 (browser) using HTTP communication. In this case, the control device 70 of the intermediary server 50 performs processing of steps S60 to S64 of FIG. 3 in accordance with a program corresponding to resource part "scan" of the URL 222 comprised in the GET command 226.

In step S60 of FIG. 3, the web data generation portion 87 of the intermediary server 50 extracts each parameter comprised in the query part from the URL 222 in the GET command 226.

In step S62 of FIG. 3, the web data generation portion 87 specifies one scanning-and-uploading template among the plurality of scanning-and-uploading templates stored in the memory 74 using the extracted action parameter and model parameter (e.g., the action parameter "action=scan_upload" and the model parameter "model=XXX"). More specifically, the web data generation portion 87 determines that the SM template, of the SS template and the SM template, is to be used in accordance with the extracted action parameter "action=scan_upload". The web data generation portion 87 further determines that the SM template (XXX), of the SM template (XXX) and the SM template (YYY), is to be used in accordance with the extracted model parameter "model=XXX". Therefore, the web data generation portion 87 can appropriately determine to use the SM template (XXX) for generating the message data representing the message screen 228a depicted in FIG. 4 among the plurality of scanning-and-uploading templates.

When the URL 222 in the GET command 226 comprises the model parameter "model=YYY", in step S62 of FIG. 3, the web data generation portion 87 determines the SM template (YYY) to be used, for generating the message data representing the message screen 228b depicted in FIG. 4 among the plurality of scanning-and-uploading templates.

In step S64 of FIG. 3, the web data generation portion 87 generates message data 228 using the determined SM template (XXX). The message data 228 is web data in a format interpretable by the Web browser of the mobile terminal 150. More specifically, the web data generation portion 87 generates character strings indicating each parameter in the SM template (XXX) in accordance with the extracted account parameter and scanning settings parameter (e.g., "user=Alice"). Nevertheless, the web data generation portion 87 does not generate the PIN code in the scanning settings parameter in the SM template (XXX) to ensure security. Thus, the message data 228 representing the message screen 228a depicted in FIG. 4 is completed.

When the URL 222 in the GET command 226 comprises the model parameter "model=YYY", in step S64, the web data generation portion 87 generates the message data 228 based on the SM template (YYY) and each parameter (e.g., "user=Tom"). The message data 228 represents the message screen 228b depicted in FIG. 4.

Subsequent to steps S60 to S64 in FIG. 3, the third transmission portion 86 of the intermediary server 50 transmits the generated message data 228 to the mobile terminal 150 (browser) using HTTP communication in step S66 of FIG. 3. The message data 228 comprises the URL 222 as a page URL of the Web page (i.e., the message screen 228a depicted in FIG. 4). The URL 222 is the same as the URL 222 comprised in the GET command 226.

As described above, the intermediary server 50 generates the URL 222 comprising the scanning settings information in the POST command 220. Then, the intermediary server 50 transmits the message data 228 comprising the URL 222 to the mobile terminal 150 after performing communication of the redirect command 224 and the GET command 226. It could be conceivable that a configuration in which the intermediary server 50 transmits the message data 228 comprising the URL 222 to the mobile terminal 150 as a response of the POST command 220 is adopted rather than adopting the above-described configuration. That is, it could be conceivable that a configuration in which communication of the redirect command 224 and the GET command 226 is omitted is adopted. Nevertheless, in the HTTP system, when the intermediary server 50 as the Web server receives a GET command from a client, the intermediary server 50 can transmit web data in response to the GET command. When the intermediary server 50 as the Web server receives a POST command as a client, the intermediary server 50 cannot transmit web data as a response to the POST command. Therefore, in the first illustrative embodiment, the configuration in which communication of the redirect command 224 and the GET command 226 is performed is adopted.

In step S70 of FIG. 3, the mobile terminal 150 (browser) displays thereon the message screen 228a (see FIG. 4) represented by the message data 228. As depicted in FIG. 4, the topmost field in the message screen 228a indicates the URL 222 in the message data 228. The message screen 228a further comprises a message indicating that the mobile terminal 150 is brought closer to the MFP 10A and the scanning settings information specified by the user. The user can confirm the scanning settings information through the message screen 228a and thus notice that the mobile terminal 150 needs to be brought closer to the MFP 10A.

The user brings the mobile terminal 150 closer to the MFP 10A. As a result, an NFC connection is established again between the MFP 10A and the mobile terminal 150 (OS). Upon establishment of the NFC connection therebetween, the mobile terminal 150 (OS) transmits the URL 222 described in the message screen 228a to the MFP 10A using the NFC connection. That is, in step S72 of FIG. 3, the mobile terminal 150 (OS) transmits the URL 222 described in the message screen 228a to the MFP 10A via NFC. As described above, the system of transmitting the page URL (e.g., the URL 222) of the Web page using the NFC connection during establishment of the NFC connection under a condition where the Web page (e.g., the message screen 228a) is displayed is contained in the OS program in advance. That is, the mobile terminal 150 (OS) has a system of transmitting the URL of the Web page displayed by the Web browser via NFC when the Web browser is active as a foreground program at the time of the establishment of the NFC connection. Therefore, the mobile terminal 150 (OS) can transmit the URL 222 to the MFP 10A via NFC without a special application program installed on the mobile terminal 150.

As depicted in the message screen 228a in FIG. 4, each character string in the message screen 228a comprises the scanning settings information (e.g., "Alice", "AAA", and "800×600"). Therefore, it could be conceivable that a configuration in which the mobile terminal 150 transmits each character string comprised in the message screen 228a to the MFP 10A via NFC to provide the MFP 10A with the scanning settings information is adopted. However, a special application program needs to be installed on the mobile terminal 150 to transmit the exact web data or part of the character strings of the web data via NFC when the mobile terminal 150 receives the web data (e.g., the message data 228) as a result of HTTP communication. In the light of the circumstances, in the first illustrative embodiment, the configuration in which the intermediary server 50 generates the URL 222 comprising the scanning settings information and transmits the message data 228 comprising the URL 222 to the mobile terminal 150 is adopted. Therefore, the mobile terminal 150 (OS) transmits the URL 222 to the MFP 10A via NFC without a special application program installed on the mobile terminal 150. Accordingly, the mobile terminal 150 can provide the MFP 10A with the scanning settings information.

The reception portion 42 of the MFP 10A receives the URL 222 from the mobile terminal 150 (OS) via NFC. Upon receipt of the URL 222, in step S80, the extraction portion 43 of the MFP 10A extracts the scanning settings information from the URL 222. More specifically, the extraction portion 43 extracts each parameter including and subsequent to "user=Alice" comprised in the URL 222.

In step S80 of FIG. 3, further, the processing execution portion 44 of the MFP 10A performs PIN code authentication using the extracted account parameter (e.g., "user=Alice" and "service=AAA") and the PIN code (e.g., "pin=mmmmm") found in the extracted scanning settings parameter. More specifically, first, the processing execution portion 44 acquires the PIN code associated with the extracted account parameter from the memory 34. Then, the processing execution portion 44 determines whether the acquired PIN code matches the PIN code in the scanning settings parameter. When the two PIN codes match with each other, the processing execution portion 44 proceeds to a scanning process in step S82 of FIG. 3. When the two PIN codes do not match with each other, the processing execution portion 44 displays an error message on the display portion 14 and does not perform the scanning process in step S82 of FIG. 3.

In step S82 of FIG. 3, the processing execution portion 44 of the MFP 10A performs the scanning and uploading process in accordance with the extracted scanning settings information. More specifically, the processing execution portion 44 allows the scanning execution portion 20 to scan a document in accordance with the extracted scan resolution and number of colors. For the MFP 10B, the processing execution portion 44 allows the scanning execution portion 20 to scan a document in accordance with the extracted scan resolution, number of colors, and file type. Then, the processing execution portion 44 generates image data (i.e., scan data) having the resolution and the number of colors.

After that, the processing execution portion 44 acquires the access token associated with the extracted account parameter (e.g., "user=Alice" and "service=AAA") from the memory 34. Then, the processing execution portion 44 transmits the access token to the service providing server 100 (e.g., the service providing server 100 corresponding to the parameter "service=AAA") corresponding to the extracted account parameter. Thus, the service providing server 100 performs authentication using the access token. Then, in step S84 of FIG. 3, the processing execution portion 44 transmits the extracted folder name and the scan data 240 to the service providing server 100.

The service providing server 100 stores the scan data received from the MFP 10A in the folder having the folder name received from the MFP 10A. Thus, the service providing server 100 offers data storage service to the MFP 10A. In other words, the MFP 10A obtains the data storage service from the service providing server 100. Namely, the user of the mobile terminal 150 can allow the MFP 10A to perform the scanning and uploading process by using the mobile terminal 150.

When the MFP 10A has a Web server function and is connected to the same LAN to which the mobile terminal 150 is connected, the mobile terminal 150 can access the Web server of the MFP 10A using HTTP communication via the LAN. In this case, the mobile terminal 150 acquires each piece of user information in the account settings information 36 via the LAN. Then, the mobile terminal 150 transmits the scanning settings information to the MFP 10A. Nevertheless, as described above, in the first illustrative embodiment, it is assumed that the mobile terminal 150 and the MFP 10A are not connected to the same LAN. Under this condition, the mobile terminal 150 cannot access the MFP 10A using HTTP communication. As depicted in FIGS. 2 and 3, in the first illustrative embodiment, the mobile terminal 150 can acquire each piece of user information (e.g., the URL 202 in FIG. 2) from the MFP 10A and transmit the scanning settings information to the MFP 10A (e.g., URL 222 in FIG. 3) under a condition where the mobile terminal 150 and the MFP 10A are not connected to the same LAN. In addition, a special application does not need to be installed on the mobile terminal 150.

As depicted in FIG. 2, when an NFC connection is established between the MFP 10A and the mobile terminal 150, the MFP 10A performs NFC. Then, the MFP 10A transmits the URL 202 comprising each piece of user information in the account settings information 36 stored in the MFP 10A. When the mobile terminal 150 receives the URL 202 using NFC, the mobile terminal 150 transmits the GET command 210 comprising the URL 202 to the intermediary server 50 using HTTP communication. In this case, the intermediary server 50 generates the scanning settings data 212 (e.g., steps S30 to S34 in FIG. 2) and transmits the scanning settings data 212 to the mobile terminal 150. The scanning settings data 212 represents the scanning settings screen 212a in which each piece of user information found in the URL 202 is described. Thus, the mobile terminal 150 displays the scanning settings screen 212a thereon (e.g., step S40). Therefore, the user of the mobile terminal 150 can specify specific user-information to be used by the MFP 10A while looking at each piece of user information in the scanning settings screen 212a. When the mobile terminal 150 receives the URL 202 as a result of NFC, the mobile terminal 150 is not required to interpret each piece of user information in the URL 202 to display the user information. Further, once the mobile terminal 150 transmits the GET command 210 comprising the URL 202 to the intermediary server 50, the scanning settings screen 212a can be displayed on the mobile terminal 150. Therefore, the scanning settings screen 212a can be displayed on the mobile terminal 150 appropriately without a special application installed on the mobile terminal 150.

As depicted in FIG. 3, the mobile terminal 150 transmits the POST command 220 comprising the scanning settings information to the intermediary server 50 using HTTP communication. In response to this, the intermediary server 50 generates the URL 222 comprising the scanning settings information (e.g., step S50) and transmits the redirect command 224 to the mobile terminal 150. The redirect command 224 is for instructing an access to the URL 222. Therefore, the mobile terminal 150 transmits the GET command 226 to the intermediary server 50. In response to this, the intermediary server 50 transmits the message data 228 to the mobile terminal 150. Therefore, the mobile terminal 150 displays the message screen 228a thereon. Thus, the user brings the mobile terminal 150 closer to the MFP 10A. Accordingly, the mobile terminal 150 transmits the URL 222 comprising the scanning settings information to the MFP 10A via NFC. The mobile terminal 150 can transmit the scanning settings information to the MFP 10A using NFC without a special application installed on the mobile terminal 150.

When the MFP 10A performs NFC and receives the URL 222 from the mobile terminal 150, the MFP 10A extracts the scanning settings information from the URL 222 (e.g., step S80). Then, the MFP 10A performs the scanning and uploading process using the scanning settings information. Therefore, the MFP 10A can perform the scanning and uploading process appropriately.

Figure 5:
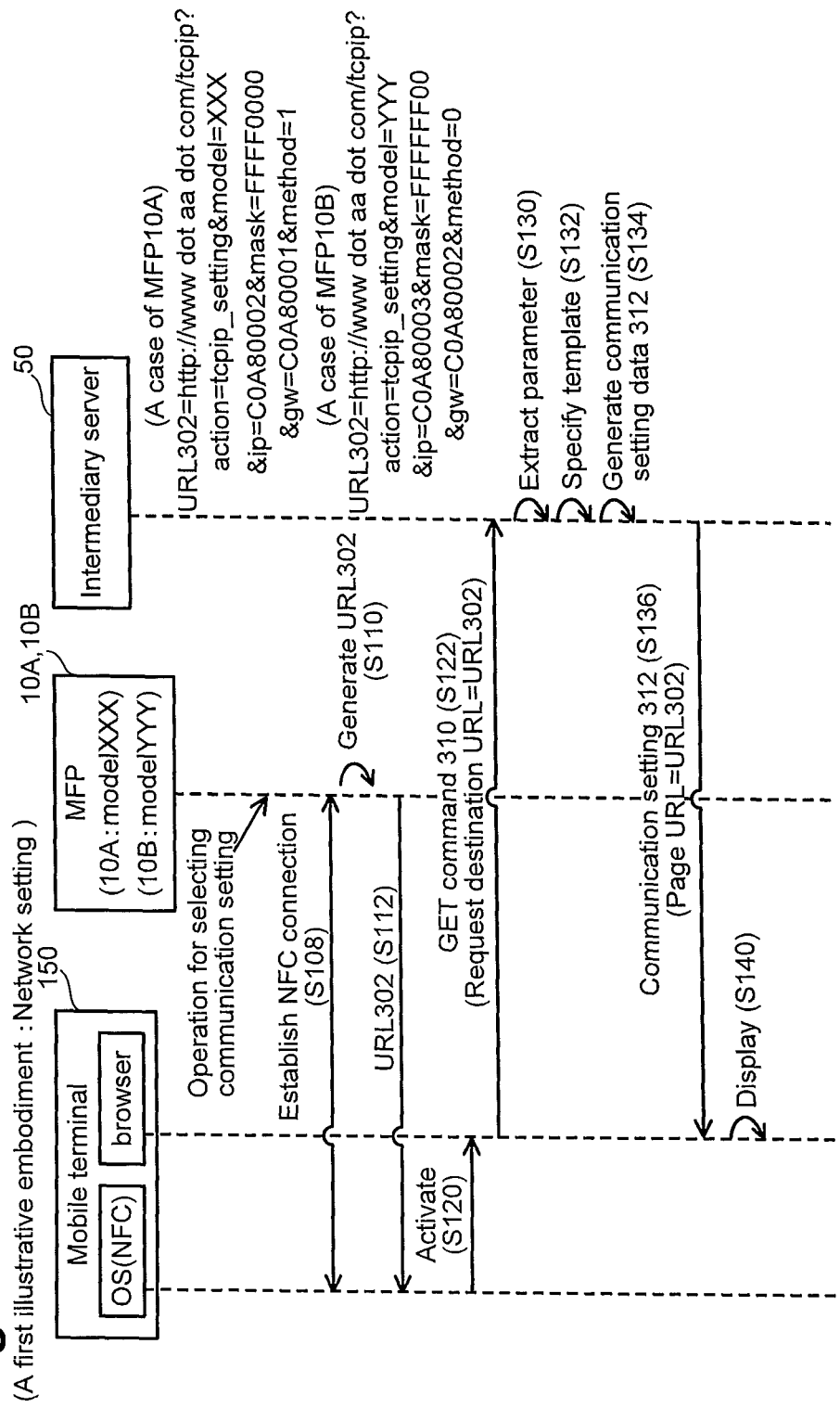
FIG. 5 is a sequence diagram depicting operations performed by each device during a settings change process performed by the multifunction peripheral in the first illustrative embodiment according to one or more aspects of the disclosure.

Referring to FIG. 5, details of processing performed to allow the MFP 10A to perform the settings change process that is instructed by the user of the mobile terminal 150 using the mobile terminal 150 will be described. In the settings change process, the details of the network settings information 38 are changed. Although detailed description is omitted, the user of the mobile terminal 150 can allow the MFP 10B to perform the settings change process similar to the MFP 10A. In the description below, a description will be omitted for processing of the settings change process that is the same as the processing of the scanning and uploading process depicted in FIGS. 2 to 4.

When the user of the mobile terminal 150 desires to change the details of the network settings information 38 stored in the MFP 10A, first, the user operates the operation portion 12 of the MFP 10A. Then, the user of the mobile terminal 150 selects an option indicating "communication settings" on the menu screen of the display portion 14 of the MFP 10A. Hereinafter, this operation is referred to as a "communication settings selection operation".

Next, the user brings the mobile terminal 150 closer to the MFP 10A to establish an NFC connection between the mobile terminal 150 and the MFP 10A. Thus, in step S108 of FIG. 5, an NFC connection is established between the mobile terminal 150 and the MFP 10A.

When the communication settings selection operation is performed, the control device 30 of the MFP 10A activates a communication settings program for generating and transmitting a URL 302. When an NFC connection is established between the mobile terminal 150 and the MFP 10A, in step S110 of FIG. 5, the control device 30 generates the URL 302 in accordance with the communication settings program.

A URL "FOR MFP 10A" depicted in FIG. 5 represents an example of the URL 302 generated by the control device 30 of the MFP 10A. The URL 302 comprises a domain part "http://www$_{dot}$aa$_{dot}$com/tcpip" and a query part (e.g., a part including and subsequent to "?"). A resource part "tcpip" of the domain part of the URL 302 is different from the resource part "scan" of the domain part "http://www$_{dot}$aa$_{dot}$com/scan" of the URL 202 depicted in FIG. 2. Therefore, the intermediary server 50 is enabled to perform processing of steps S130 to S134 in FIG. 5 and steps S160 to S164 in FIG. 6.

The control device 30 acquires the domain part "http://www$_{dot}$aa$_{dot}$com/tcpip" from the memory 34. Then, the control device 30 acquires an action parameter "action=tcpip_setting" and the model parameter "model=XXX" from the memory 34.

The control device 30 further acquires the network settings information 38 stored in the memory 34. As described above, the network settings information 38 comprises the IP address, the subnet mask, the gateway address, and the IP address assignment method. The control device 30 generates each network settings parameter. Each network settings parameter indicates information found in the network settings information 38. In each network settings parameter, a parameter "ip=" represents the IP address, a parameter "mask=" represents the subnet mask, a parameter "gw=" represents the gateway address, and a parameter "method=" represents the IP address assignment method. Specific values of the IP address, the subnet mask, and the gateway address are described in hexadecimal numerals. For the IP address assignment method, a parameter "method=0" represents the DHCP method, a parameter "method=1" represents the static method, and a parameter "method=2" represents the RARP method.

The control device 30 combines the action parameter, the model parameter, and each network settings parameter to generate a query part. Then, the control device 30 combines the domain part and the query part to generate the URL 302. After that, step S112 of the FIG. 5, the transmission portion 41 of the MFP 10A transmits the generated URL 302 to the mobile terminal 150 using NFC.

When the mobile terminal 150 (OS) receives the URL 302 as a result of NFC, in step S120 of FIG. 5, the mobile terminal 150 (OS) activates the mobile terminal 150 (browser). Then, the mobile terminal 150 (browser) transmits the GET command 310 comprising the URL 302 as the request destination URL to the intermediary server 50.

The first reception portion 81 of the intermediary server 50 receives a GET command 310 which is transmitted from the mobile terminal 150 (browser) in step S122 of FIG. 5. Upon receipt of the GET command 310, the control device 70 of the intermediary server 50 performs processing of steps S130 to S134 in accordance with a program corresponding to "tcpip" of the URL 302 comprised in the GET command 310.

In step S130 of FIG. 5, the web data generation portion 87 of the intermediary server 50 extracts each parameter found in the query part from the URL 302 comprised in the GET command 310. In step S132 of FIG. 5, the web data generation portion 87 determines one communication settings template from a plurality of communication settings templates stored in the memory 74, using the extracted action parameter (e.g., the action parameter "action=tcpip_setting") and the extracted model parameter (e.g., the model parameter "model=XXX").

The plurality of communication settings templates stored in the memory 74 comprises a communication setting ("CS") template and a communication message ("CM") template. The CS template is for generating communication settings data representing one of communication settings screens 312a and 312b depicted in FIG. 7. The CM template is for generating message data representing one of message screens 328a and 328b depicted in FIG. 7. The plurality of communication settings templates comprises a CS template (XXX), a CS template (YYY), a CM template (XXX), and a CM template (YYY) for each MFP model as a template for each model.

Each of the CS template (XXX) and the CS template (YYY) comprises a character string indicating a model name. Each of the CS template (XXX) and the CS template (YYY) comprises, for example, a character string "MFP[XXX] TCP/IP Wizard Step 1". In this respect, the CS template (XXX) and the CS template (YYY) are different from each other. Further, each of the CS template (XXX) and the CS template (YYY) comprises a plurality of boxes in which network settings information are specified. The MFP 10A of the model name "XXX" is available to use one of the three methods (e.g., the DHCP method, the static method, and the RARP method), as the IP address assignment method. Therefore, in the CS template (XXX), three options can be displayed in a box (e.g., Boot Method) for specifying the IP address assignment method. The MFP 10B of the model name "YYY" is able to use one of the two methods (e.g., the DHCP method and the static method), as the IP address assignment method. Therefore, in the CS template (YYY), two options can be displayed in the box for specifying the IP address assignment method. In this respect, the CS template (XXX) and the CS template (YYY) are different from each other.

Each of the CM template (XXX) and the CM template (YYY) comprises a character string indicating a model name. Each of the CM template (XXX) and the CM template (YYY) comprises, for example, a character string "MFP[XXX] TCPIP Wizard Step 2". In this respect, the CM template (XXX) and the CM template (YYY) are different from each other.

In step S132 of FIG. 5, the web data generation portion 87 determines one CS template (XXX) among the plurality of communication settings templates in accordance with the extracted action parameter and model parameter (e.g., the action parameter "action=tcpip_setting" and the model parameter "model=XXX"). The determined CS template (XXX) is for generating communication settings data representing the communication settings screen 312a depicted in FIG. 7.

In step S134 of FIG. 5, the web data generation portion 87 generates character strings (e.g., the IP address "192.168.0.2") in the respective boxes of the CS template (XXX) based on the extracted network settings parameters (e.g., the parameter "ip=C0A80002"). Thus, the communication settings data 312 representing the communication settings screen 312a depicted in FIG. 7 is completed.

Subsequent to steps S130 to S134 in FIG. 5, the first transmission portion 84 of the intermediary server 50 transmits the generated communication settings data 312 to the mobile terminal 150 (browser) in step S136 of FIG. 5. Therefore, in step S140 of FIG. 5, the mobile terminal 150 (browser) displays thereon the communication settings screen 312a (see FIG. 7) represented by the communication settings data 312.

As depicted in FIG. 6, the user of the mobile terminal 150 is allowed to specify new network settings information to be used by the MFP 10A by operating the mobile terminal 150 while looking at the communication settings screen 312a. The network settings information 38 currently specified in the MFP 10A are indicated in the plurality of boxes on the communication settings screen 312a. Therefore, the user of the mobile terminal 150 is allowed to specify new network settings information while confirming the network settings information 38 currently specified in the MFP 10A.

The mobile terminal 150 (browser) generates a POST command 320 comprising the new network settings information and the model name "XXX" of the MFP 10A. Then, in step S144 of FIG. 6, the mobile terminal 150 (browser) transmits the POST command 320 to the intermediary server 50.

The second reception portion 82 of the intermediary server 50 receives the POST command 320 from the mobile terminal 150 (browser). Upon receipt of the POST command 320, in step S150 of FIG. 6, the location information generation portion 88 of the intermediary server 50 generates a URL 322 in accordance with the network settings information comprised in the POST command 320. A URL "FOR MFP 10A" depicted in FIG. 3 represents an example of the URL 322 generated by the location information generation portion 88 when the POST command 320 comprising the model name "XXX" is received.

The URL 322 comprises an action parameter "action=tcpip_change" that is different from the action parameter "action=tcpip_setting" of the URL 302 depicted in FIG. 5. The user of the mobile terminal 150 has changed the IP address assignment method from the static method to the RARP method on the communication settings screen 312a. Therefore, the URL 322 comprises a network settings parameter "method=2" that is different from the network settings parameter "method=1" of the URL 302 depicted in FIG. 5.

Then, the second transmission portion 85 of the intermediary server 50 generates a redirect command 324 comprising the URL 322 as a redirect destination URL. After that, in step S152 of FIG. 6, the second transmission portion 85 of the intermediary server 50 transmits the redirect command 324 to the mobile terminal 150 (browser).

Upon receipt of the redirect command 324, in step S154 of FIG. 6, the mobile terminal 150 (browser) transmits a GET command 326 comprising the URL 322 as the request destination URL to the intermediary server 50 in accordance with the redirect command 324.

The third reception portion 83 of the intermediary server 50 receives the GET command 326 from the mobile terminal 150 (browser). Upon receipt of the GET command 326, the control device 70 of the intermediary server 50 performs processing of steps S160 to S164 in accordance with a program corresponding to "tcpip" of the URL 322 in the GET command 326.

Details of steps S160 to S164 in FIG. 6 are the same as the details of steps S60 to S64 in FIG. 3. That is, in step S160 of FIG. 6, the web data generation portion 87 of the intermediary server 50 extracts each parameter from the URL 322. Then, in step S162 of FIG. 6, the web data generation portion 87 of the intermediary server 50 determines, using the extracted action parameter (e.g., the action parameter "action=tcpip_change") and the extracted model parameter (e.g., the model parameter "model=XXX"), that the CM template (XXX) is to be used. The CM template (XXX) is for generating message data representing the message screen 328a depicted in FIG. 7. Then, in step S164 of FIG. 6, the web data generation portion 87 generates message data 328 using each of the extracted network settings parameters and the determined CM template (XXX). Thus, the message data 328 representing the message screen 328a depicted in FIG. 7 is completed. Then, in step S166 of FIG. 6, the third transmission portion 86 of the intermediary server 50 transmits the generated message data 328 to the mobile terminal 150 (browser).

In step S170 of FIG. 6, the mobile terminal 150 (browser) displays the message screen 328a (see FIG. 7) represented by the message data 328. The user is allowed to confirm the network settings information newly specified by the user by looking at the message screen 328a. Further, the user can notice that the mobile terminal 150 needs to be brought closer to the MFP 10A. In step S172 of FIG. 6, the mobile terminal 150 (OS) transmits the URL 322 described on the message screen 328a to the MFP 10A via NFC.

The reception portion 42 of the MFP 10A receives the URL 322 from the mobile terminal 150 (OS) via NFC. Upon receipt of the URL 322, in step S180 of FIG. 6, the extraction portion 43 of the MFP 10A extracts the network settings information from the URL 322. Then, in step S182 of FIG. 6, the processing execution portion 44 of the MFP 10A stores the extracted new network settings information in the memory 34 as a substitute for the current network settings information 38. Thus, the MFP 10A can acquire the IP address of the MFP 10A in accordance with the RARP method, for example, as a substitute for the static method. Then, the MFP 10 is enabled to perform various communication using the new network settings information.

In the first illustrative embodiment, the mobile terminal 150 acquires the network settings information 38 of the MFP 10A under a condition where the mobile terminal 150 and the MFP 10A are not connected with the same LAN. Further, the mobile terminal 150 is enabled to transmit the new network settings information to the MFP 10A. Moreover, the communication settings screen 312a in which the network settings information 38 are described can be displayed on the mobile terminal 150 without a special application installed on the mobile terminal 150. Furthermore, the mobile terminal 150 can transmit the new network settings information to the MFP 10A via NFC without a special application installed on the mobile terminal 150.

When the MFP 10A performs NFC to receive the URL 322 from the mobile terminal 150, the MFP 10A extracts the network settings information from the URL 322 (e.g., step S180). Then, the MFP 10A performs the settings change process using the newly-specified network settings information. In the settings change process, the newly-specified network settings information is stored in the memory 34. Thus, the MFP 10A can perform the settings change process appropriately.

The MFP 10A (or the MFP 10B) is an example of a "communication device". The intermediary server 50 is an example of a "server". The mobile terminal 150 is an example of a "terminal device". NFC is an example of a "wireless communication". Each of the model "XXX" and the model "YYY" is an example of a "specific model". Each of the model parameter "model=XXX" and the model parameter "model=YYY" is an example of a "model information".

In the case depicted in FIGS. 2 to 4, the part including and subsequent to "/scan" of the URL 202 is an example of "first location information". The URL 222 is an example of "second location information". The GET command 210 is an example of a "request". The redirect command 224 is an example of a "redirect command". The GET command 226 is an example of a "second request". Each piece of user information represented by the user parameter and the service parameter (e.g., the user parameter "Alice%2cBob" and the service parameter "service=AAA%2cBBB") in the URL 202 is an example of "first setting information" and "one or more account information". Each of the scanning settings screen 212a and the scanning settings screen 212b is an example of a "message screen". The message screen 228a is an example of a "second web data". Each of the SS template (XXX) and the SS template (YYY) is an example of a "template". The scanning settings information comprised in the POST command 220 is an example of "new settings information". The scanning and uploading process is an example of a "process for setting new setting information".

In the case depicted in FIGS. 5 to 7, the part including and subsequent to "/tcpip" of the URL 302 is an example of the "first location information". The URL 322 is an example of the "second location information". The GET command 310 is an example of the "request". The redirect command 324 is an example of the "redirect command". The GET command 326 is an example of the "second request". The network settings information 38 represented by the network settings parameter comprised in the URL 302 is an example of the "first setting information" and "network setting information". Each of the communication settings screen 312a and the communication settings screen 312b is an example of the "message screen". The message screen 328a is an example of the "second web data". Each of the CS template (XXX) and the CS template (YYY) is an example of the "template". The newly-specified network settings information comprised in the POST command 320 is an example of the "new settings information". The settings change process is an example of the "process for setting new setting information".

Next, a second illustrative embodiment will be described. A description will be made for parts that are different from the parts of the first illustrative embodiment. In the first illustrative embodiment, each of the URL 202 depicted in FIG. 2 and the URL 222 depicted in FIG. 3 comprises the model parameter (e.g., the model parameter "model=XXX") representing the model name. In the second illustrative embodiment, the model parameter is not used, which is different from the first illustrative embodiment.

Referring to FIGS. 8 and 9, the scanning and uploading process according to the second illustrative embodiment will be described. Details of steps and elements depicted in FIG. 8 are basically the same as the details of steps and the elements depicted in FIG. 2. Nevertheless, a URL 402 depicted in FIG. 8 is different from the URL 202 depicted in FIG. 2. More specifically, in step S210 of FIG. 8, the control device 30 of the MFP 10A generates the URL 402 comprising a domain part comprising a resource part "scan1" and a query part not comprising the model parameter "model=XXX". The control device (not depicted) of the MFP 10B generates the URL 402 comprising a domain part comprising a resource part "scan2" and a query part not comprising the model parameter "model=YYY". The above two URLs 402 comprise the same server name "www$_{dot}$aa$_{dot}$com" and the respective different domain parts because their resource parts are different from each other.

When the domain part of the URL 402 comprised in the GET command 410 comprises the resource part "scan1", the web data generation portion 87 of the intermediary server 50 performs processing of steps S230 to S234 in accordance with the program corresponding to the model name "XXX". More specifically, in step S232, the web data generation portion 87 determines, using the extracted action parameter "action=scan_setting", that the SS template (XXX), of the SS template (XXX) and the SM template (XXX), is to be used. When the domain part of the URL 402 in the GET command 410 comprises the resource part "scan2", the web data generation portion 87 of the intermediary server 50 performs processing of steps S230 to S234 in accordance with the program corresponding to the model name "YYY". More specifically, in step S232 of FIG. 8, the web data generation portion 87 determines, using the extracted action parameter "action=scan_setting", that the SS template (YYY) of the SS template (YYY) and the SM template (YYY) to be used.

The URL 402 depicted in FIG. 8 is different from the URL 202 depicted in FIG. 2. Therefore, the URL 402 indicated in the topmost field of one of scanning settings screens 412a and 412b depicted in FIG. 10 is different from the URL 202 indicated in the topmost field of one of the scanning settings screens 212a and 212b depicted in FIG. 4. Details of the other steps (e.g., steps S220 and S240) and the other elements (e.g., the scanning settings data 412) depicted in FIG. 8 are the same as the details of steps (e.g., steps S20 and S40) and the elements (e.g., the scanning settings data 212) depicted in FIG. 2.

Details of steps and elements depicted in FIG. 9 are basically the same as the details of steps and the elements depicted in FIG. 3. Nevertheless, a URL 422 depicted in FIG. 9 is different from the URL 222 depicted in FIG. 3. More specifically, when the POST command 420 comprises the model name "XXX", in step S250 of FIG. 9, the location information generation portion 88 of the intermediary server 50 generates the URL 422 comprising a domain part comprising "/scan1" and a query part not comprising the model parameter "model=XXX". When the POST command 420 comprises the model name "YYY", the location information generation portion 88 generates the URL 422 comprising a domain part comprising "/scan2" and a query part not comprising the model parameter "model=YYY".

When the domain part of the URL 422 comprised in the GET command 426 comprises the resource part "scan1", the web data generation portion 87 of the intermediary server 50 performs processing of steps S260 to S264 in accordance with the program corresponding to the model name "XXX". More specifically, in step S262 of FIG. 9, the web data generation portion 87 determines, using the extracted action parameter "action=scan_upload", that the SM template (XXX) of the SS template (XXX) and the SM template (XXX) to be used. When the domain part of the URL 422 comprised in the GET command 426 comprises the resource part "scan2", the web data generation portion 87 performs processing of steps S260 to S264 in accordance with the program corresponding to the model name "XXX". More specifically, in step S262 of FIG. 9, the web data generation portion 87 determines, using the extracted action parameter "action=scan_upload, that the SM template (YYY) of the SS template (YYY) and the SM template (YYY) to be used".

The URL 422 depicted in FIG. 9 is different from the URL 222 depicted in FIG. 3. Therefore the URL 422 indicated in the topmost field on one of message screens 428a and 428b depicted in FIG. 10 is different from the URL 222 indicated in the topmost field on one of the message screens 228a and 228b depicted in FIG. 4. Details of the other steps (e.g., steps S270, S280, and S282) and the other elements (e.g., a redirect command 424, message data 428, and scan data 440) depicted in FIG. 9 are the same as the details of steps (e.g., steps S70, S80, and S82) and the elements (e.g., the redirect command 224, the message data 228, and the scan data 240) depicted in FIG. 3.

In the second illustrative embodiment, similar to the first illustrative embodiment, the intermediary server 50 can transmit appropriate web data (e.g., the scanning settings data 412 or the message data 428) to the mobile terminal 150 in accordance with the model of the MFPs 10A and 10B. In the second illustrative embodiment, each of the resource part "scan1", and the resource part "scan2" is an example of the "model information".

While the disclosure has been described in detail with reference to the specific embodiments thereof, these are merely examples, and various changes, arrangements and modifications may be applied therein without departing from the spirit and scope of the disclosure. For example, variations described below may be applied.

For example, in other embodiments, the MFP 10A may generate a first URL in FIG. 2. The first URL may be the URL 202 comprising a domain part "http://www$_{dot}$aa$_{dot}$com/scan1" and a query part not comprising the model parameter and the action parameter (hereinafter, referred to as an "omitted query part"). The MFP 10B may generate a second URL. The second URL may be the URL 202 comprising a domain part "http://www$_{dot}$aa$_{dot}$com/scan2" and the omitted query part. In FIG. 3, when the POST command 220 comprises the model name "XXX", in step S50, the location information generation portion 88 may generate a third URL. The third URL may be the URL 222 comprising a domain part "http://www$_{dot}$aa$_{dot}$com/scan3" and the omitted query part. When the POST command 220 comprises the model name "YYY", the location information generation portion 88 may generate a fourth URL. The fourth URL may be the URL 222 comprising a domain part "http://www$_{dot}$aa$_{dot}$com/scan4" and the omitted query part.

According to the above configuration, the web data generation portion 87 of the intermediary server 50 can perform the different processes appropriately in accordance with each resource part (e.g., the resource part "scan1") of the first to fourth URLs found in the respective GET commands. For example, when the GET command comprising the first URL is received, the web data generation portion 87 determines to use the SS template (XXX) (e.g., step S32 in FIG. 2) in accordance with a program corresponding to the resource part "scan1" comprised in the first URL and generates the scanning settings data 212 representing the scanning settings screen 212a depicted in FIG. 4 appropriately. For example, when the GET command comprising the fourth URL is received, the web data generation portion 87 determines to use the CM template (YYY) (e.g., step S62 in FIG. 3) in accordance with a program corresponding to the resource part "scan4" comprised in the fourth URL and generates the message data 228 representing the message screen 228b depicted in FIG. 4.

In this case, similar to the second illustrative embodiment, each of the resource part "scan1", and the resource part "scan2" is an example of the "model information". In contrast to the second illustrative embodiment, it is unnecessary to describe the action parameter in the query part of the URL.

In each of the above-described illustrative embodiments, focus is placed on the account settings information 36 and the network settings information 38 stored in the MFP 10A. Nevertheless, in other embodiments, for example, the techniques described in each of the above-described illustrative embodiments may be used to display a web screen on which other settings information stored in the MFP 10A, for example, one or more of the printing settings information representing default printing settings, the scanning settings information representing default scanning settings, and information of a telephone directory, is described, on the mobile terminal 150. In this case, for example, the printing settings information is an example of the "current settings information".

Wi-Fi communication (i.e., HTTP communication) is applied the embodiments of the disclosures. In other embodiments, for example, another wireless communication such as third Generation in compliance with standards of the International Mobile Telecommunication-2000 ("IMT-2000) may be applied to other embodiments. Instead of HTTP communication, communication in accordance with another protocol for web data communication (e.g., Hypertext Transfer Protocol Secure ("HTTPS") according to HTTP) may be used. The "short-range wireless communication" is not limited to NFC either. The "short-range wireless communication" may be, for example, infrared communication or BlueTooth® communication (BlueTooth® is a registered trademark of BLUETOOTH SIG. INC. of Kirkland, Wash.).

In each of the above-described illustrative embodiments, the message screen 228a comprising the message indicating such that "Please bring your mobile terminal closer to the MFP." is an example of the "one or more instructions for transmitting new setting information". Nevertheless, in other embodiments, for example, the "second specific data" may comprise a message indicating such that "Please let your mobile terminal perform NFC." That is, the "one or more instructions for transmitting new setting information" may comprise a message indicating that the terminal device is allowed to perform the wireless communication e.g. NFC. Generally speaking, the "second specific data" may be configured to indicate at least the instruction for transmitting the specified settings information to the communication device.

In each of the above-described illustrative embodiments, the processing depicted in FIGS. 2 and 3 are performed in the case depicted in FIGS. 2 to 4. Nevertheless, in other embodiments, for example, in the case depicted in FIGS. 2 to 4, only the processing depicted in FIG. 2 may be performed while the processing depicted in FIG. 3 is omitted. In this case, also, the scanning settings screen 212a can be displayed appropriately on the mobile terminal 150. That is, the intermediary server 50 might not comprise the second reception portion 82, the third reception portion 83, the second transmission portion 85, the third transmission portion 86, and the location information generation portion 88.

In each of the above-described illustrative embodiments, the intermediary server 50 comprises a single device. Nevertheless, in other embodiments, for example, the intermediary server 50 may comprise two or more devices that are independent from each other. For example, the intermediary server 50 may comprise a first device and a second device. In this case, the first device may be configured to generate the scanning settings data 212 representing the scanning settings screen 212a corresponding to the MFP 10A. The second device may be configured to generate the scanning settings data 212 representing the scanning settings screen 212b corresponding to the MFP 10B. In another case, for example, the intermediary server 50 may comprise a first device configured to generate the scanning settings data 212 and a second device configured to generate the message data 228. That is, the intermediary server 50 may comprise a first device configured to generate the redirect destination URL and a second device that may serve as the redirect destination. Generally speaking, the "specific server" may comprises a physically single device or two or more independent devices. In each of the above-described illustrative embodiments, each function of the portions 41 to 44 and 81 to 88 is implemented by one of the CPU 32 of the MFP 10A and the CPU 72 of the intermediary server 50 to perform processing in accordance with software. In addition, instead of this, part of the functions of the portions 41 to 44 and 81 to 88 may be implemented by hardware such as a logical circuit.

What is claimed is:

1. A non-transitory computer-readable storage medium storing computer readable instructions therein that, when executed by a processor of a server configured to store setting information configured to be set in a communication device, cause the server to:
   receive, from a terminal device, a request including first setting information indicating a setting of the communication device using a protocol configured to be used by a browser of the terminal device;
   generate, in response to receiving the request, first specific data comprising a first location information for location of first web data configured to display a message screen for specifying new setting information including the first setting information for the communication device, the first specific data configured to be in a format for transmission using the protocol;
   transmit the first specific data to the terminal device using the protocol;
   receive, from the terminal device, the new setting information using the protocol;
   generate, in response to receiving the new setting information, a second specific data comprising second location information for location of second web data configured to display one or more instructions for transmitting the new setting information from the terminal device to the communication device using a short-range wireless communication, the second specific data configured to be in a format for transmission using the protocol; and
   transmit the second specific data to the terminal device using the protocol;
   wherein the generating comprises generating a redirect command configured to cause the terminal device to acquire the second web data based on the second location information for location of the second web data in the server;
   wherein the transmitting the second specific data comprises transmitting the redirect command, to the terminal device,
   wherein the computer-readable instructions further causes the server to:
   receive a second request from the terminal device after transmitting the redirect command; and
   transmit the second web data to the terminal device, in response to receiving the second request.

2. A non-transitory computer-readable storage medium storing computer readable instructions therein that, when executed by a processor of a server configured to store setting information configured to be set in a communication device, cause the server to:
   receive, from a terminal device, a request including first setting information indicating a setting of the communication device using a protocol configured to be used by a browser of the terminal device;
   generate, in response to receiving the request, first specific data comprising a first location information for location of first web data configured to display a message screen for specifying new setting information including the first setting information for the communication device, the first specific data configured to be in a format for transmission using the protocol;
   transmit the first specific data to the terminal device using the protocol;
   receive, from the terminal device, the new setting information using the protocol;
   generate, in response to receiving the new setting information, a second specific data comprising second location information for location of second web data configured to display one or more instructions for transmitting the new setting information from the terminal device to the communication device using a short-range wireless communication, the second specific data configured to be in a format for transmission using the protocol; and transmit the second specific data to the terminal device using the protocol;

wherein a range of the short-range wireless communication between the communication device and the terminal device is shorter than a range of Wi-Fi communication; and, wherein the message screen is configured to display one or more instructions for bringing the terminal device closer to the communication device.

3. The medium according to claim 1,
wherein the first setting information comprises one or more account information, each account information configured to allow the communication device to get service from a service providing server; and
wherein the generating the first web data comprises generating the first web data configured to display the message screen for specifying a specific account information of the one or more account information.

4. The medium according to claim 1,
wherein the first setting information comprises network setting information indicating a setting of the communication device for communicating via a network; and
wherein the generating the first web data comprises generating the first web data configured to display the message screen for specifying new network setting information.

5. The medium according to claim 1,
wherein the first setting information comprises model information specifying a specific model among a plurality of models of the communication device;
wherein generating the first specific data comprises generating the message screen for specifying the new setting information based on the specific model, when the received model information represents the specific model; and
wherein transmitting the first specific data comprises transmitting the first specific data comprising the message screen for the specific model.

6. The medium according to claim 5,
wherein the memory of the server is configured to store a plurality of templates corresponding to the plurality of models;
wherein the generating the first specific data comprises generating the first web data using a specific template of the plurality of templates corresponding to the specific model, when the received model information represents the specific model.

7. A non-transitory computer-readable storage medium storing computer readable instructions therein that, when executed by a processor of a server configured to store setting information configured to be set in a communication device, cause the server to:
receive, from a terminal device, a request including first setting information indicating a setting of the communication device using a protocol configured to be used by a browser of the terminal device;
generate, in response to receiving the request, first specific data comprising a first location information for location of first web data configured to display a message screen for specifying new setting information including the first setting information for the communication device, the first specific data configured to be in a format for transmission using the protocol;
transmit the first specific data to the terminal device using the protocol;
receive, from the terminal device, the new setting information using the protocol;
generate, in response to receiving the new setting information, a second specific data comprising second location information for location of second web data configured to display one or more instructions for transmitting the new setting information from the terminal device to the communication device using a short-range wireless communication, the second specific data configured to be in a format for transmission using the protocol; and
transmit the second specific data to the terminal device using the protocol;
wherein the communication device is configured to scan an image;
wherein the first setting information comprises scan resolution indicating a setting of the communication device for scanning; and
wherein generating the first specific data comprises generating the message screen for specifying new scan resolution;
wherein receiving the first request further comprises model information specifying a specific model among a plurality of models of the communication device;
wherein generating the first specific data comprises generating the message screen for specifying the new scan resolution based on the specific model, when the received model information represents the specific model.

8. The medium according to claim 1,
wherein the first specific data comprises a Uniform Resource Locator comprising the first location information and the first setting information; and
wherein the second specific data comprises a Uniform Resource Locator comprising the second location information and the new setting information.

9. The medium according to claim 8,
wherein the protocol comprises a hypertext transfer protocol; and
wherein the first specific data and the second specific data are configured to be in a Uniform Resource Locator format for transmission using the hypertext transfer protocol.

10. A communication device comprising:
a processor; and
a memory configured to store first setting information indicating setting of the communication device, and computer-readable instructions therein that, when executed by the processor, cause the communication device to:
establish short-range wireless communication between a terminal device and the communication device;
transmit, to the terminal device using a protocol configured to be used by a browser of the terminal device, the first setting information for specifying new setting information, the transmit performed using the short-range wireless communication, the first setting information is configured to be in a format for transmission using the protocol;
receive using the protocol, from the terminal device, second specific data comprising the new setting information, the receive performed using the short-range wireless communication, and the second specific data is configured to be in a format for transmission using the protocol; and
perform a process for setting the new setting information;

wherein the communication device further comprises:
a short-range wireless communication interface for establishing the short-range wireless communication between the terminal device and the communication device, for transmitting the first location information to the terminal device, and for receiving the new setting information from the terminal device;
a network communication interface for performing network communication; and
a scan execution portion configured to scan an image;
wherein the first setting information comprises scan resolution indicating a setting of the communication device for scanning; and
wherein receiving the new setting information comprises receiving new scan resolution from the terminal device using the short-range wireless communication interface; and
wherein performing the process comprises performing a process for setting the new scan resolution.

11. The communication device, according to claim 10, further comprising:
a printing execution portion configured to print;
wherein the first setting information comprises default print setting information indicating a setting of the communication device.

12. The medium according to claim 2,
wherein the first setting information comprises one or more account information, each account information configured to allow the communication device to get service from a service providing server; and
wherein the generating the first web data comprises generating the first web data configured to display the message screen for specifying a specific account information of the one or more account information.

13. The medium according to claim 2,
wherein the first setting information comprises network setting information indicating a setting of the communication device for communicating via a network; and
wherein the generating the first web data comprises generating the first web data configured to display the message screen for specifying new network setting information.

14. The medium according to claim 2,
wherein the first setting information comprises model information specifying a specific model among a plurality of models of the communication device;
wherein generating the first specific data comprises generating the message screen for specifying the new setting information based on the specific model, when the received model information represents the specific model; and
wherein transmitting the first specific data comprises transmitting the first specific data comprising the message screen for the specific model.

15. The medium according to claim 14,
wherein the memory of the server is configured to store a plurality of templates corresponding to the plurality of models;
wherein the generating the first specific data comprises generating the first web data using a specific template of the plurality of templates corresponding to the specific model, when the received model information represents the specific model.

16. The medium according to claim 2,
wherein the first specific data comprises a Uniform Resource Locator comprising the first location information and the first setting information; and
wherein the second specific data comprises a Uniform Resource Locator comprising the second location information and the new setting information.

17. The medium according to claim 16,
wherein the protocol comprises a hypertext transfer protocol; and
wherein the first specific data and the second specific data are configured to be in a Uniform Resource Locator format for transmission using the hypertext transfer protocol.

18. The medium according to claim 7,
wherein the first setting information comprises one or more account information, each account information configured to allow the communication device to get service from a service providing server; and
wherein the generating the first web data comprises generating the first web data configured to display the message screen for specifying a specific account information of the one or more account information.

19. The medium according to claim 7,
wherein the first setting information comprises network setting information indicating a setting of the communication device for communicating via a network; and
wherein the generating the first web data comprises generating the first web data configured to display the message screen for specifying new network setting information.

20. The medium according to claim 7,
wherein the first setting information comprises model information specifying a specific model among a plurality of models of the communication device;
wherein generating the first specific data comprises generating the message screen for specifying the new setting information based on the specific model, when the received model information represents the specific model; and
wherein transmitting the first specific data comprises transmitting the first specific data comprising the message screen for the specific model.

21. The medium according to claim 20,
wherein the memory of the server is configured to store a plurality of templates corresponding to the plurality of models;
wherein the generating the first specific data comprises generating the first web data using a specific template of the plurality of templates corresponding to the specific model, when the received model information represents the specific model.

22. The medium according to claim 7,
wherein the first specific data comprises a Uniform Resource Locator comprising the first location information and the first setting information; and
wherein the second specific data comprises a Uniform Resource Locator comprising the second location information and the new setting information.

23. The medium according to claim 22,
wherein the protocol comprises a hypertext transfer protocol; and
wherein the first specific data and the second specific data are configured to be in a Uniform Resource Locator format for transmission using the hypertext transfer protocol.

24. The communication device according to claim 10,
wherein a range of the short-range wireless communication interface of the communication device is shorter than a range of Wi-Fi communication.

25. The communication device according to claim 24,
wherein the short-range wireless communication interface comprises near field communication interface.

26. The communication device according to claim 10:
wherein the first setting information comprises one or more account information configured to allow the communication device to get service from a service providing server using the network communication interface;

wherein receiving the new setting information comprises receiving a specified account information from the terminal device using the short-range wireless communication interface; and wherein performing the process comprises performing a request for authentication to the service providing server according to the specified account information using the network communication interface.

27. The communication device according to claim 10:

wherein the first setting information comprises network setting information indicating a setting of the communication device for communicating using the network communication interface;

wherein receiving the new setting information comprises receiving new network setting information from the terminal device using the short-range wireless communication interface; and wherein performing the process comprises performing a process for setting the new network setting information.

* * * * *